US006805349B2

(12) United States Patent
Baerlocher et al.

(10) Patent No.: US 6,805,349 B2
(45) Date of Patent: Oct. 19, 2004

(54) GAMING DEVICE WITH WILD ACTIVATION SYMBOLS AND WILD TERMINATION SYMBOLS

(75) Inventors: Anthony J. Baerlocher, Reno, NV (US); Joseph E. Kaminkow, Reno, NV (US); Paulina Glavich, Reno, NV (US)

(73) Assignee: IGT, Reno, NV (US)

( * ) Notice: Subject to any disclaimer, the term of this patent is extended or adjusted under 35 U.S.C. 154(b) by 191 days.

(21) Appl. No.: 09/964,102

(22) Filed: Sep. 26, 2001

(65) Prior Publication Data

US 2003/0057645 A1 Mar. 27, 2003

(51) Int. Cl.$^7$ .......................... A63B 71/00; A63B 67/00; A63F 1/00; A63F 13/00; A63F 9/24

(52) U.S. Cl. ................................ 273/138.2; 273/138.1; 273/461; 463/13; 463/16; 463/20; 463/25

(58) Field of Search ........................... 273/138.1, 138.2, 273/148 R, 148 B, 242, 461; 463/1, 2, 7, 9, 13, 16–22, 25, 26, 30, 36, 38, 46

(56) References Cited

U.S. PATENT DOCUMENTS

| | | | | |
|---|---|---|---|---|
| 5,308,065 A | | 5/1994 | Bridgeman et al. | |
| 5,332,228 A | | 7/1994 | Schultz | |
| 5,423,539 A | | 6/1995 | Nagao | |
| 5,431,408 A | | 7/1995 | Adams | |
| 5,449,173 A | | 9/1995 | Thomas et al. | |
| 5,772,506 A | * | 6/1998 | Marks et al. | 463/13 |
| 5,823,873 A | | 10/1998 | Moody | |
| 5,882,261 A | * | 3/1999 | Adams | 463/20 |
| 5,980,384 A | * | 11/1999 | Barrie | 463/16 |
| 6,004,207 A | * | 12/1999 | Wilson et al. | 463/20 |
| 6,059,289 A | * | 5/2000 | Vancura | 273/143 R |
| 6,059,658 A | | 5/2000 | Mangano et al. | |
| 6,089,977 A | | 7/2000 | Bennett | |
| 6,117,009 A | * | 9/2000 | Yoseloff | 463/20 |
| 6,120,031 A | | 9/2000 | Adams | |
| 6,159,095 A | | 12/2000 | Frohm et al. | |
| 6,190,254 B1 | | 2/2001 | Bennett | |
| 6,190,255 B1 | * | 2/2001 | Thomas et al. | 463/20 |
| 6,220,959 B1 | | 4/2001 | Holmes, Jr. et al. | |
| 6,251,013 B1 | | 6/2001 | Bennett | |
| 6,299,165 B1 | | 10/2001 | Nagano | |
| 6,299,170 B1 | | 10/2001 | Yoseloff | |
| 6,302,398 B1 | | 10/2001 | Vecchio | |
| 6,311,976 B1 | | 11/2001 | Yoseloff et al. | |

(List continued on next page.)

FOREIGN PATENT DOCUMENTS

| | | | |
|---|---|---|---|
| AU | WO 9732285 | | 9/1997 |
| AU | 199717601 | B2 | 9/1997 |
| AU | 199917318 | A1 | 9/1999 |
| EP | 0984408 | A2 | 3/2000 |
| GB | 2 193 827 | A | 2/1988 |
| WO | WO 00/32286 | * | 6/2000 |
| WO | WO 00/66235 | | 11/2000 |
| WO | WO 00/76606 | A1 | 12/2000 |

OTHER PUBLICATIONS

Wild Streak Advertisement written by WMS Gaming, Inc., published in 2001.

Penguin Pays Advertisement written by Aristocrat Incorporated, published in 1998.

(List continued on next page.)

*Primary Examiner*—Jessica Harrison
*Assistant Examiner*—Binh-An D. Nguyen
(74) *Attorney, Agent, or Firm*—Bell, Boyd & Lloyd LLC

(57) ABSTRACT

The present invention provides a gaming device having a wild activation symbol displayed on a set of reels or set of cards within a display device. The processor causes other symbols or cards to become wild within the display device when the wild termination symbol is displayed. When the wild activation symbol is displayed, the present invention may also provide a wild termination symbol on the set of reels or the set of cards within a display device. The processor may then stop symbols or cards from becoming wild based on the position of the wild termination symbol.

39 Claims, 20 Drawing Sheets

U.S. PATENT DOCUMENTS

| | | | | | |
|---|---|---|---|---|---|
| 6,322,078 | B1 | | 11/2001 | Adams | |
| 6,358,144 | B1 | | 3/2002 | Kaddlic et al. | |
| 6,419,579 | B1 | * | 7/2002 | Bennett | 463/20 |
| 6,428,412 | B1 | * | 8/2002 | Anderson et al. | 463/9 |
| 6,439,993 | B1 | | 8/2002 | O'Halloran | |
| 6,439,995 | B1 | * | 8/2002 | Hughs-Baird et al. | 463/20 |
| 6,454,266 | B1 | | 9/2002 | Breeding et al. | |
| 6,494,454 | B2 | | 12/2002 | Adams | |

OTHER PUBLICATIONS

Black Swan Paytable Display written by IGT, published prior to 2001.

Jackpot Party Brochure and Articles written by WMS Gaming, Inc, published in 1988.

The Basics of Winning Video Poker (Chapter VI Deuces Wild & Chapter VII Jokers Wild) written by J. Edward Allen, published in 1990.

Enchanted Unicorn Advertisement written by IGT, published in 2001.

Introducing the "Smiling Ape" Machine Advertisement (including Joker's Wild Poker description) written by IGT, published prior to 2001.

Your Real Key to Gaming Success Advertisement (including Roll Over Beethoven and Wild Fortune) written by Olympic Video Gaming, published dated unknown.

Description of Symbol Feature in Australian UFO Gaming Machine written by Barcrest Ltd., published in 1995.

Reel Magic™ Gaming Machine Description written by IGT, available in 1986.

Enchanted Forest™ Gaming Description from Aristocrat, available in 1994.

Joker's Wild Advertisement written by IGT, published prior to 2001.

Happy Camper Advertisement written by IGT, published in 2001.

Fishin' Buddies Article published in Strictly Slots/Anchor Games, published in Apr. 2001.

Boot Scootin Article written by Strictly Slots/Aristocrat Leisure Industries, PTY Ltd., published date unknown.

Little Green Men, Jr. Advertisement written by A.C. Coin and Slot Services Company, published prior to 2002.

Cash Chameleon Article written by Strictly Slots/Aristocrat Leisure Industries, PTY Ltd., published in Apr. 2001.

Loco Loot Article written by Strictly Slots/Aristocrat Leisure Industries, PTY Ltd., published in May 2002.

Break the Spell Atronic Web Page, published in Jan. 2001.

Break the Spell Brochure, published in 1999.

Cossack Dance Advertisement written by Olympic Video Gaming, published prior to 2002.

* cited by examiner

GAMING DEVICE WITH WILD ACTIVATION SYMBOLS AND WILD TERMINATION SYMBOLS

CROSS REFERENCE TO RELATED APPLICATIONS

This application relates to the following co-pending commonly owned patent applications: "GAMING DEVICE HAVING DUAL EVALUATION SCHEME," Ser. No. 09/687,689; "GAMING DEVICE HAVING TRANSFORMABLE WILD SYMBOLS OR CARDS WITH WILD SIGNAL INDICATORS," Ser. No. 09/957,305; "GAMING DEVICE HAVING WILD INDICATORS," Ser. No. 09/960,883; "GAMING DEVICE HAVING A VARIED WILD SYMBOL IN A BONUS GAME," Ser. No. 10/243,512; "GAMING DEVICE HAVING SYMBOLS WITH TRANSFORMATION PROBABILITIES," Ser. No. 10/255,880; "GAMING DEVICE HAVING RESULTANT WILD SYMBOLS," Ser. No. 10/191,154; and "GAMING DEVICE HAVING EXTENDER SYMBOLS," Ser. No. 10/191,197.

BACKGROUND OF THE INVENTION

Gaming devices are well known. Many known gaming devices provide wild symbols or wild cards. Wild symbols provide a player with an additional opportunity to obtain winning combinations. The use of wild symbols, wild cards or wild indicators in gaming devices provide additional excitement and entertainment for players.

In a slot machine having reels, a wild symbol can enable the matching of symbols along a payline to achieve a combination. For example, in a three reel slot machine, the symbols along a payline on the first, second and third reels may be, respectively, a heart, a heart and a wild symbol. If, in the gaming scheme, the gaming device awards a player for a three heart combination, the wild symbol substitutes for a heart and provides the player with that combination.

In a video poker game, a wild symbol substitutes for a card. For example, in a five card draw poker gaming machine where the gaming device displays five cards, the cards can be a 10, Jack, Queen, King and wild card. The wild card substitutes as an Ace and provides the player with a winning combination.

Wild cards have been employed in gaming devices in other manners. For example, U.S. Pat. No. 5,431,408 discloses a gaming device having a video poker gaming scheme. A player is dealt a hand consisting of five cards. The player is also given a wild card. The wild card is separate from the dealt hand. The player can reserve the wild card for use with a subsequent hand. Thus, the player can use the wild card in a hand in which it is most advantageous to do so.

In another example, U.S. Pat. No. 6,089,977 discloses a gaming device having a roaming wild symbol. More specifically, the patent discloses a gaming device having a set of virtual reels. The reels display a set of symbols. Certain symbol combinations serve as triggering events. When one of these combinations occur on the reels, a wild card symbol appears on the reels in the form of a graphical image and moves along the reels. As the wild card symbol moves from one symbol or location to adjacent symbols or locations, the symbols transform into the wild card symbol. After each move of the wild card symbol, the gaming device determines and pays the player for any winning combination which is the result of the transformation. When the wild card symbol moves to the next adjacent symbol, the symbol previously transformed reverts to its original state.

To increase player enjoyment and excitement, it is desirable to provide gaming devices having new and different wild symbol, wild indicator and wild card schemes.

SUMMARY OF THE INVENTION

The present invention provides a gaming device including a set of reels. The reels include symbols. One of the symbols is a wild activation symbol. A player uses conventional control features to activate or spin the reels. If a wild activation symbol is displayed within a display device of the gaming device on an active payline, in a predetermined position, or in a predetermined position on an active payline, the processor causes the other displayed symbols to sequentially become wild. The processor can also cause the wild activation symbol to be wild. When a wild activation symbol occurs, the processor randomly selects one of the other displayed symbols to be a wild termination symbol. The processor sequentially causes the symbols to become wild until such wild termination symbol is reached. At this point, the processor stops any symbols from becoming wild at or beyond the position in which the wild termination symbol is displayed. It should be appreciated that the transformation process can be repeated one or more times as predetermined or as randomly determined by the processor.

In one embodiment, the gaming device provides a set of symbols on a set of reels. A plurality of the symbols are displayed by a display device. The processor determines which of the symbols will be the wild activation symbol and which of the symbols will be the wild termination symbol. The processor makes the determination when the reels are activated. The specific symbol may be chosen randomly or may be chosen in a predetermined manner. The wild activation symbol and wild termination symbol are not immediately distinguishable from the other symbols in the set of symbols. The processor sequentially transforms symbols displayed within the display device into wild symbols beginning with the wild symbol and ending with the wild termination symbol. Thus, the processor prevents the transformation of symbols into wild symbols beyond a certain position within the display device occupied by the wild termination symbol.

In one embodiment, one or both of the wild activation symbol and wild termination symbol are fixed or distinguished from the other symbols. In an example, the gaming device includes a set of reels having a plurality of symbols such as hearts, cherries, and other suitable symbols. The reels include at least one wild activation symbol. A player activates the reels using a control feature of the gaming device. A plurality of the symbols, including the wild activation symbol, are selectively displayed within the display device. The processor causes symbols within the display device to become wild sequentially. The symbols may become wild in a particular direction or in a random sequence. When the display device displays a wild activation symbol, the processor randomly determines which of the displayed symbols will be the wild termination symbol. The processor stops symbols from becoming wild beyond the position of the symbol which is determined to be the wild termination symbol.

It should also be appreciated that the reels could, in an alternative embodiment, include one or more fixed wild activation symbols and one or more fixed wild termination symbols on the reels. In this case, each set of wild activation symbols and wild termination symbols are independently utilized. The processor is also capable of causing only the wild activation symbol or the wild termination symbol on the reels. If a wild termination symbol is displayed by itself, it does not effect the outcome. If a wild activation symbol is displayed without a wild termination symbol, it causes one, a plurality, or all of the other symbols to become wild (i.e., without termination). If a wild activation symbol and a wild termination symbol are displayed, the symbols successively turn wild until reaching the wild termination symbol as described above.

It should be appreciated that the present invention could be employed in other primary games, such as video poker as described below and in bonus or secondary games.

It is therefore an advantage of the present invention to provide a gaming device having wild activation symbols and wild termination symbols.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
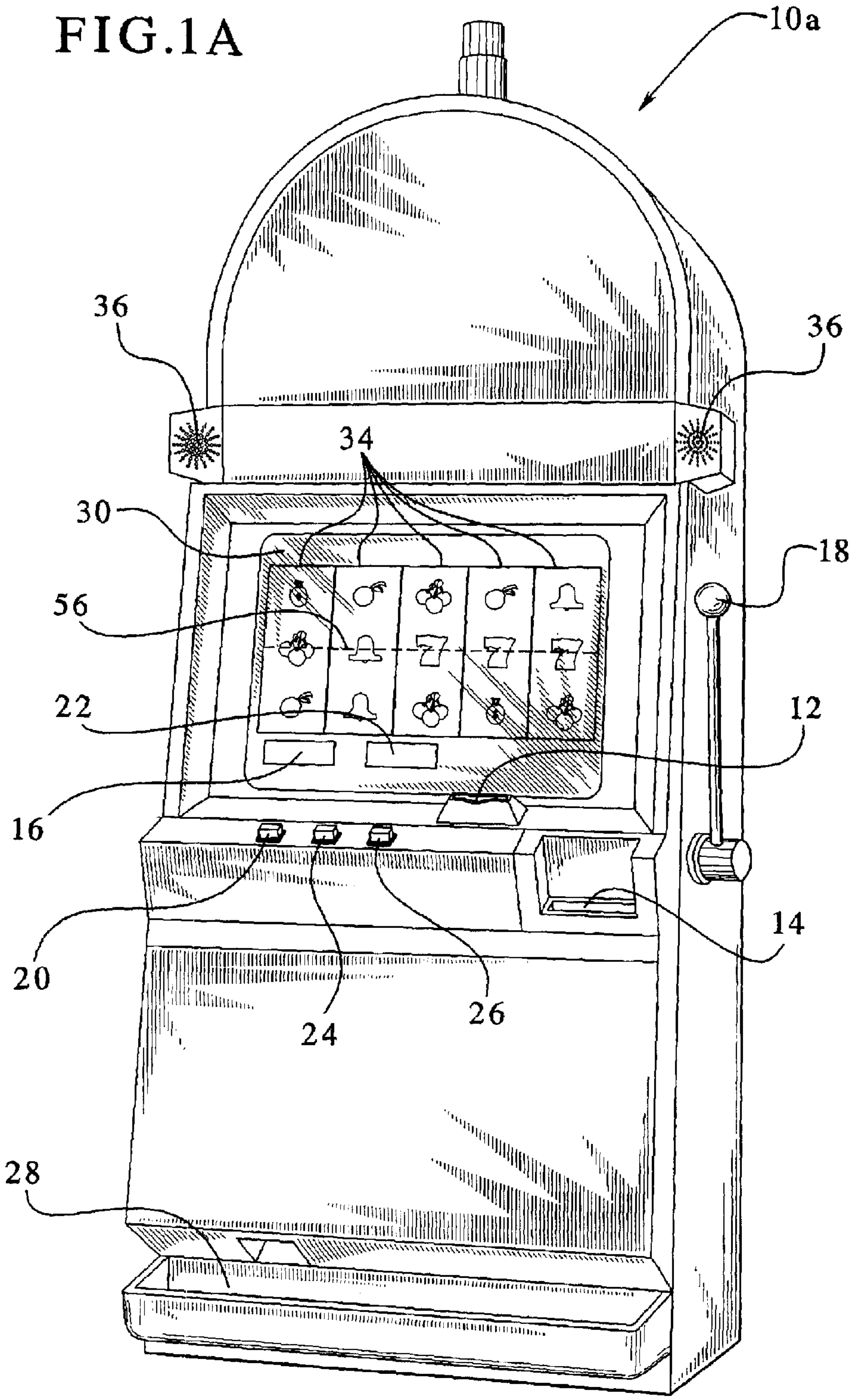
FIGS. 1A and 1B are perspective views of alternative embodiments of The gaming device of the present invention.
Figure 1B:
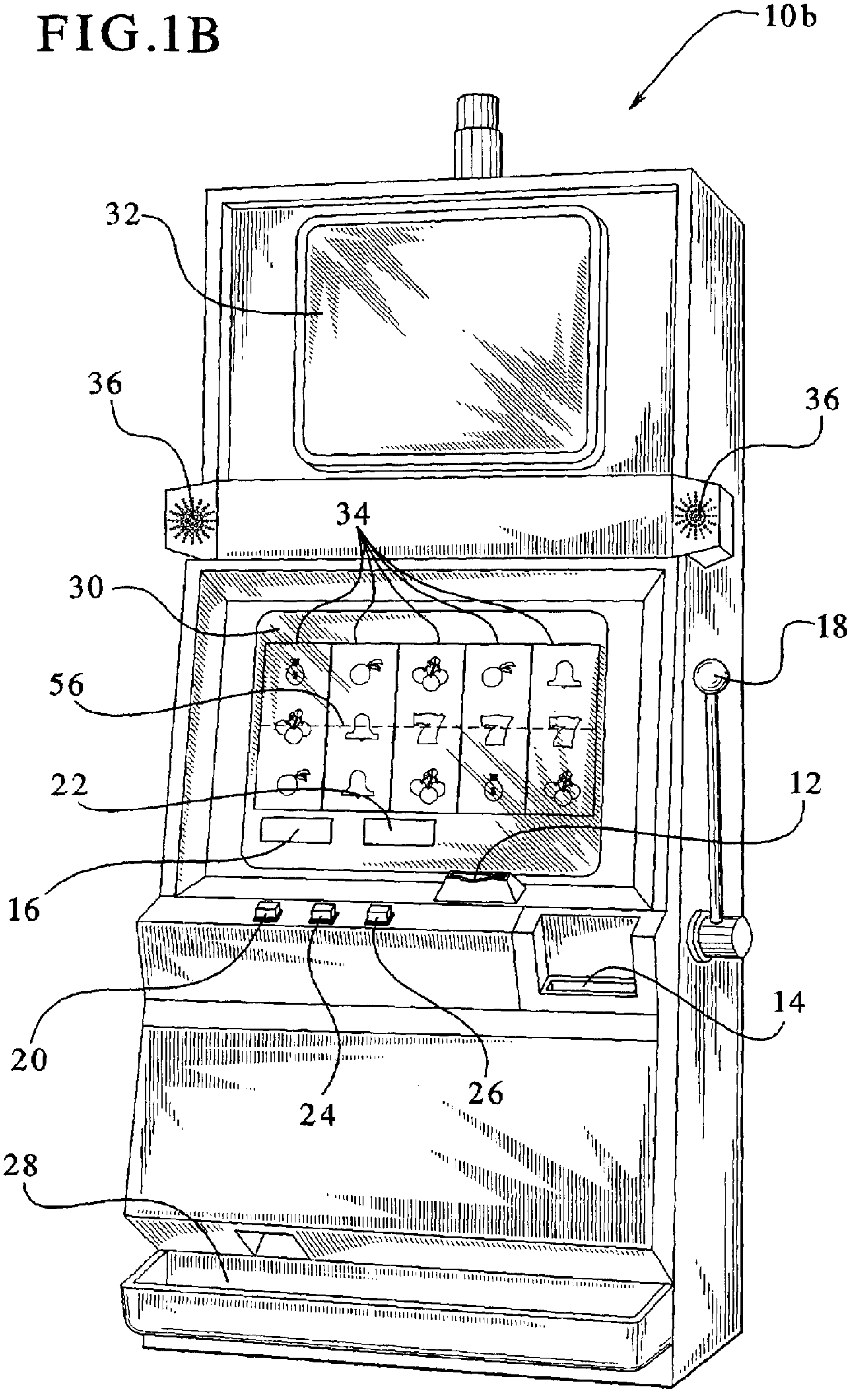

Referring now to, the drawings, and in particular to FIGS. 1A and 1B, gaming device 10*a* and gaming device 10*b* illustrate two possible cabinet styles and display arrangements and are collectively referred to herein as gaming device 10. The present invention includes the game, described below, being a stand alone game or a bonus or secondary game that coordinates with a base game. When the game of the present invention is a bonus game, gaming device 10 in one base game can be a slot machine having the controls, displays and features of a conventional slot machine, or a video card game such as poker, blackjack, etc. The player can operate the gaming device while standing or sitting. Gaming device 10 also includes being a pub-style or table-top game (not shown), which a player operates while sitting.

The base games of the gaming device 10 include slot, poker, or blackjack. The gaming device 10 also embodies any bonus triggering events, bonus games as well as any progressive game coordinating with these base games. The symbols and indicia used for any of the base, bonus and progressive games include mechanical, electrical or video symbols and indicia.

In a stand alone or a bonus embodiment, the gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. At any time during the game, a player may "cash out" by pushing a cash out button 26 to receive coins or tokens in the coin payout tray 28 or other forms of payment, such as an amount printed on a ticket or credited to a credit card, debit card or smart card.

Gaming device 10 also includes one or more display devices. The embodiment shown in FIG. 1A includes a central display device 30, and the alternative embodiment shown in FIG. 1B includes a central display device 30 as well as an upper display device 32. The display devices display any visual representation or exhibition, including but not limited to movement of physical objects such as mechanical reels and wheels, dynamic lighting and video images. The display device includes any viewing surface such as glass, a video monitor or screen, a liquid crystal display or any other static or dynamic display mechanism. In a video poker, blackjack or other card gaming machine embodiment, the display device includes displaying one or more cards.

The slot machine base game of gaming device 10 preferably displays a plurality of reels 34, preferably three to five reels 34, in mechanical or video form on one or more of the display devices. Each reel 34 displays a plurality of indicia such as bells, hearts, fruits, numbers, letters, bars or other images which preferably correspond to a theme associated with the gaming device 10. If the reels 34 are in video form, the display device displaying the video reels 34 is preferably a video monitor. Each base game, especially in the slot machine base game of the gaming device 10, includes speakers 36 for making sounds or playing music.

Figure 2:
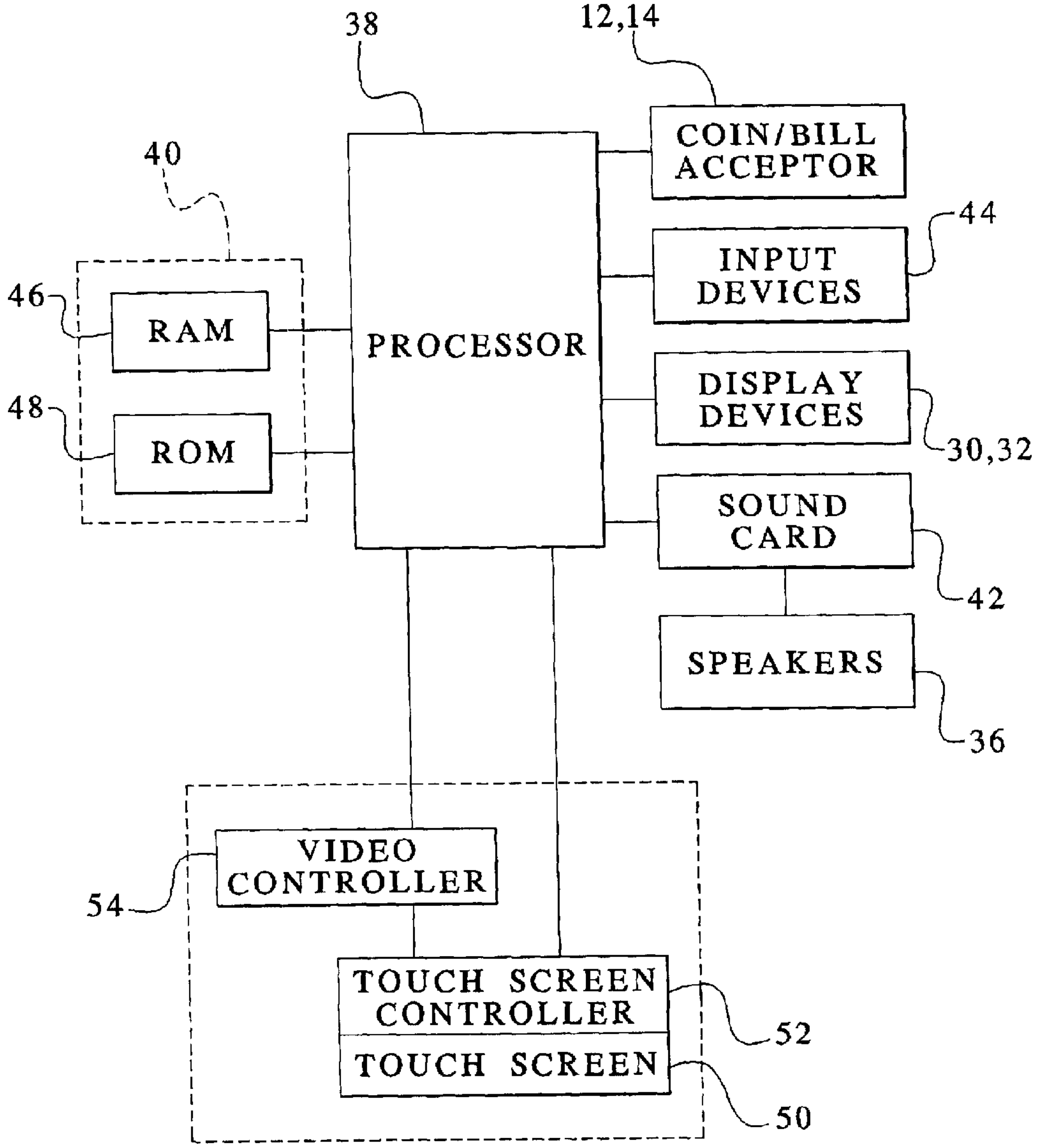
FIG. 2 is a schematic block diagram of the electronic configuration of one embodiment of the gaming device of the present invention.

Referring now to FIG. 2, a general electronic configuration of the gaming device 10 for the stand alone and bonus embodiments described above preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the gaming device 10 so that it plays a particular game in accordance with applicable game rules and pay tables.

As illustrated in FIG. 2, the player preferably uses the input devices 44 to input signals into gaming device 10. In the slot machine base game, the input devices 44 include the pull arm 18, play button 20, the bet one button 24 and the cash out button 26. A touch screen 50 and touch screen controller 52 are connected to a video controller 54 and processor 38. The terms "computer" or "controller" are used herein to refer collectively to the processor 38, the memory device 40, the sound card 42, the touch screen controller and the video controller 54.

In certain instances, it is preferable to use a touch screen 50 and an associated touch screen controller 52 instead of a conventional video monitor display device. The touch screen enables a player to input decisions into the gaming device 10 by sending a discrete signal based on the area of the touch screen 50 that the player touches or presses. As further illustrated in FIG. 2, the processor 38 connects to the coin slot 12 or payment acceptor 14, whereby the processor 38 requires a player to deposit a certain amount of money in to start the game.

It should be appreciated that although a processor 38 and memory device 40 are preferable implementations of the present invention, the present invention also includes being implemented via one or more application-specific integrated circuits (ASIC's), one or more hard-wired devices, or one or more mechanical devices (collectively referred to herein as a "processor"). Furthermore, although the processor 38 and memory device 40 preferably reside in each gaming device 10 unit, the present invention includes providing some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the gaming device 10, the player inserts the appropriate amount of tokens or money in the coin slot 12 or the payment acceptor 14 and then pulls the arm 18 or pushes the play button 20. The reels 34 then begin to spin. Eventually, the reels 34 come to a stop. As long as the player has credits remaining, the player can spin the reels 34 again. Depending upon where the reels 34 stop, the player may or may not win additional credits.

Wild Activation and Wild Termination Symbols

Figure 3A:
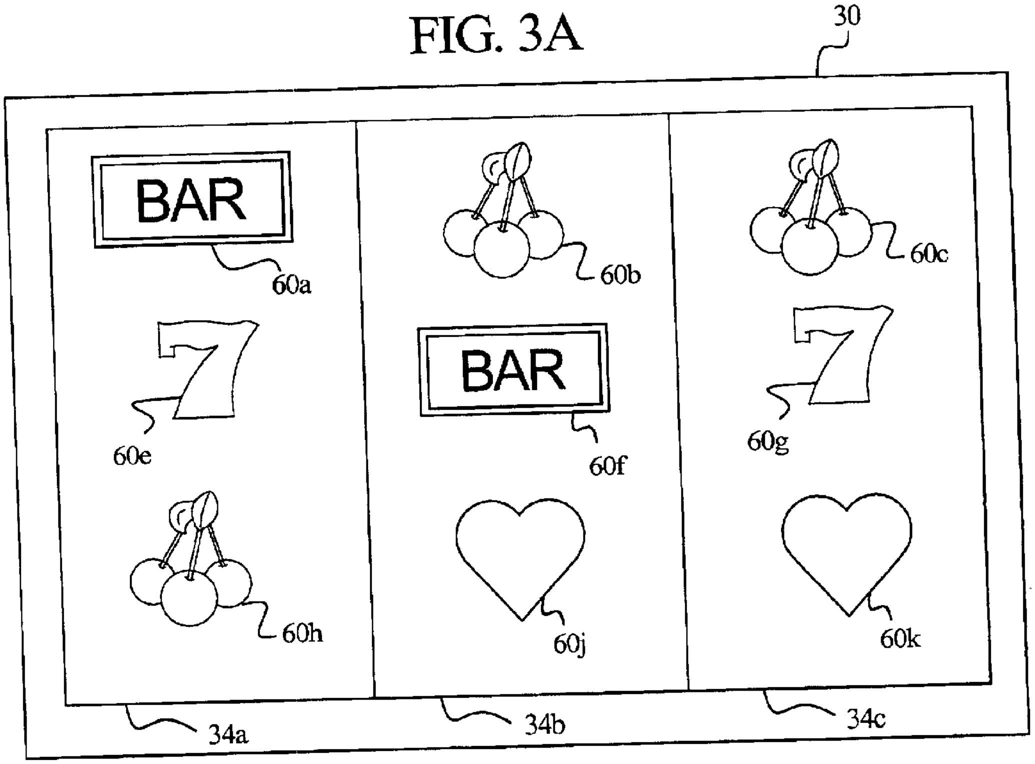
FIGS. 3A, 3B, 3C and 3D are front elevation views of a display device in which a wild activation symbol and wild termination symbol are displayed on a set of reels.

Referring now to FIG. 3A, a display device 30 displays a plurality of reels 34. The reels include a plurality of symbols 60 such as hearts, cherries, numbers, or any other suitable symbols. Any of the symbols on the reels may function as or be a wild activation symbol. Thus, the wild activation symbol can be any symbol and is not immediately distinguishable from the other symbols. The processor randomly selects which of the symbols will be the wild activation symbol and displays the wild activation symbol to the player. The processor then sequentially transforms one or more of the other symbols 60 on the reels into wild symbols.

Figure 3B:
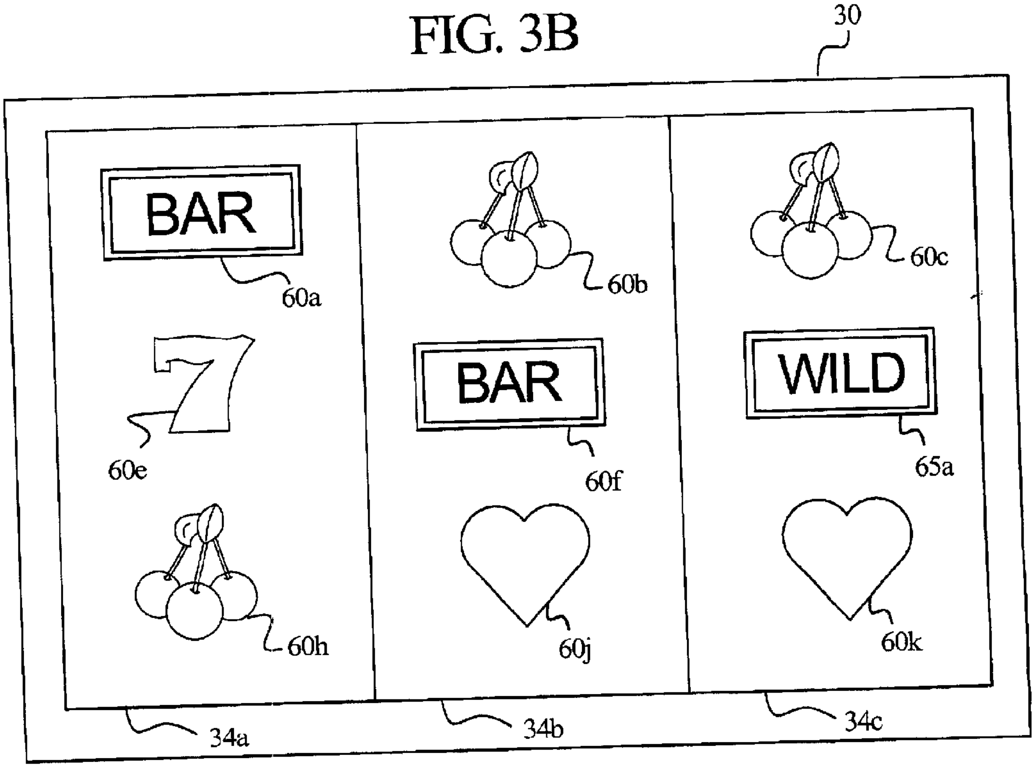
Figure 3C:
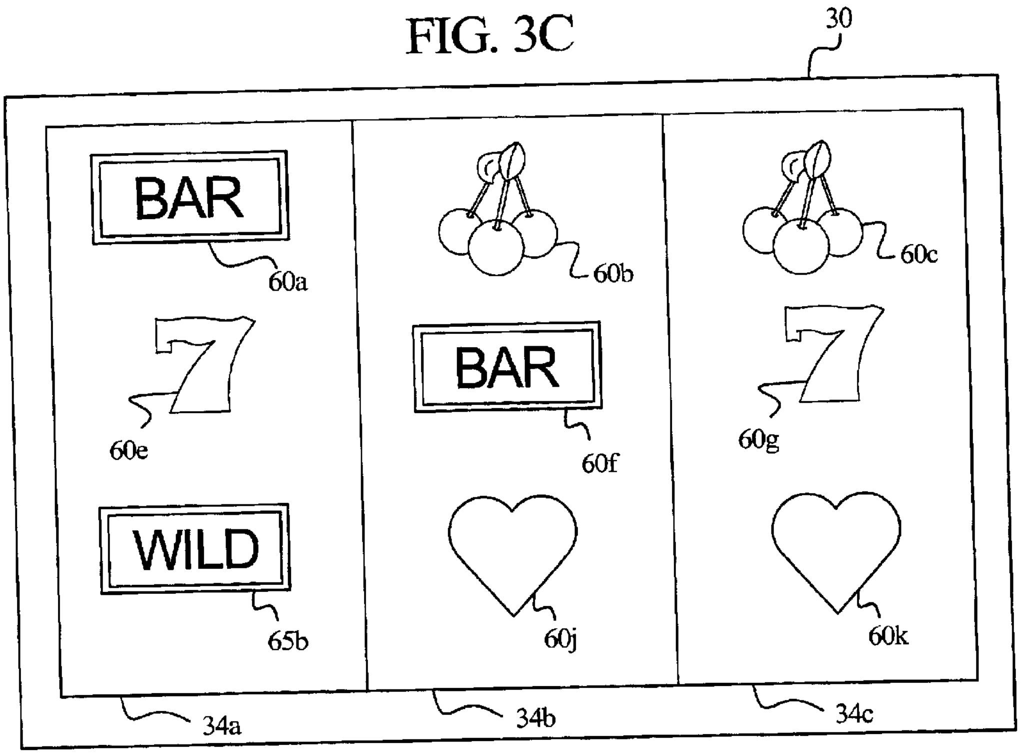
Figure 3D:
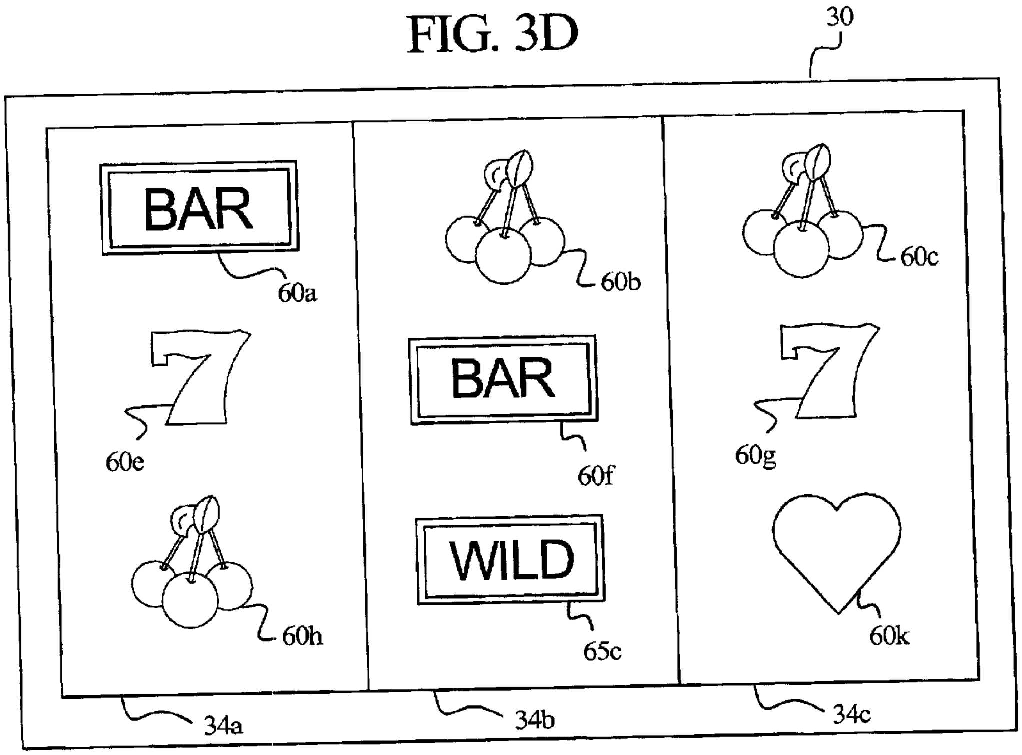

For example, a player activates or spins the reels using the control features of the gaming device. After at least one, a plurality or all of the reels stop spinning, a wild activation symbol may be displayed within the display device. In FIGS. 3B–3D, the processor determines that a BAR symbol **60*f* which is not immediately distinguishable from the other symbols and is displayed within the display device on the second reel 34*b* will be the wild activation symbol. The processor causes other symbols to become wild in a horizontal direction. Thus, the "7" symbol 60*g* displayed on-the third reel 34*c* becomes a wild symbol 65*a* as illustrated in FIG. 3B and any award is determined by the processor and provided to the player. Then, that symbol changes back to a "7" and the cherry symbol 60*h* on the first reel 34*a* becomes a wild symbol 65*b* as illustrated in FIG. 3C. Subsequently, the heart symbol 60*j* on the second reel 34*b* becomes a wild symbol 65*c* as illustrated in FIG. 3D**.

When the processor selects a symbol to be the wild activation symbol, the processor also selects a symbol to be the wild termination symbol. The wild termination symbol is also initially indistinguishable from the other symbols. In this example, the processor chooses the heart symbol **60*k* on the third reel 34*c* to be the wild termination symbol. After the processor changes symbol 60*k*,** into-a wild symbol and determines any associated awards, the processor stops changing further symbols into wild symbols. It should be appreciated that when the processor chooses a symbol as the wild activation symbol or the wild termination symbol, for which there are duplicate symbols, the only symbols which function as the wild activation symbol and the wild termination symbol are those symbols selected at the specific positions within the display device.

The processor determines if the wild activation symbol and the wild termination symbol will occur during a reel spin in a random or predetermined manner after the reels are activated. If the processor determines that a wild activation symbol will occur or be displayed within the display device, the processor also determines, in a random or predetermined manner, where the wild termination symbol will occur or be displayed, if at all, within the display device.

The gaming device provides a signal to a player that each symbol is transformed into a wild symbol. An example is the displaying of a symbol in the form of the word "WILD." In yet another example, a speaker emits a sound or message indicating the card is wild. In an embodiment in which the reels are mechanical, a backlight can be used to illuminate symbols which become wild. Any other audio or visual method of notification is also contemplated for the video or mechanical embodiments.

Figure 4A:
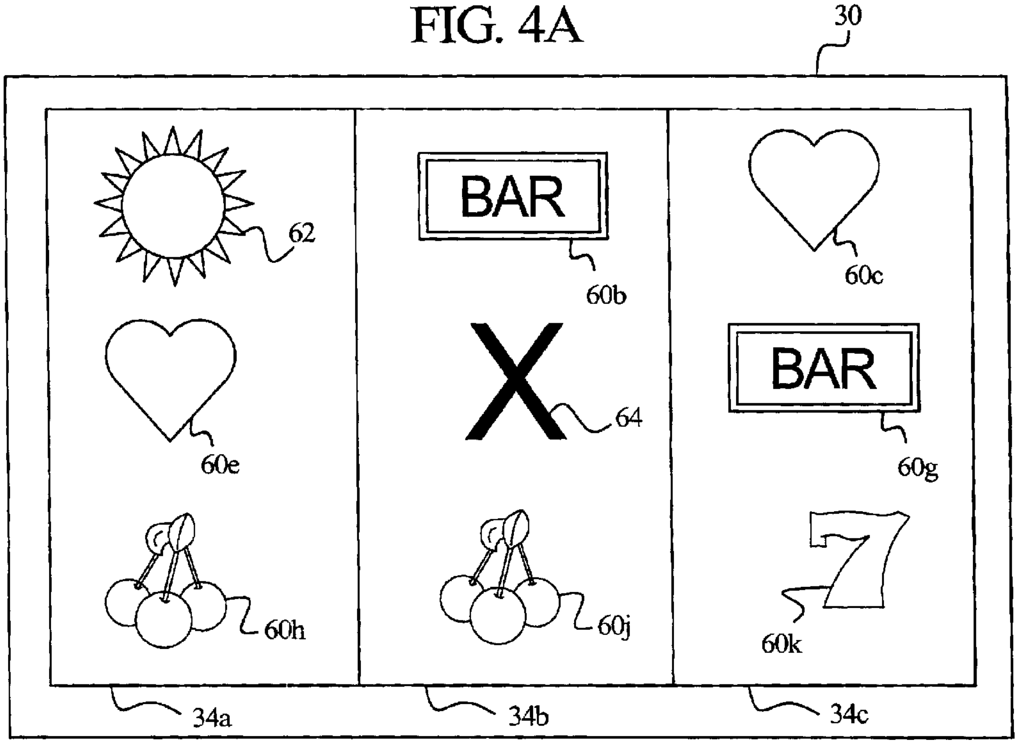
FIGS. 4A, 4B, 4C and 4D are front elevation views of a display device in which a wild activation symbol and wild termination symbol are displayed on a set of reels.
Figure 4B:
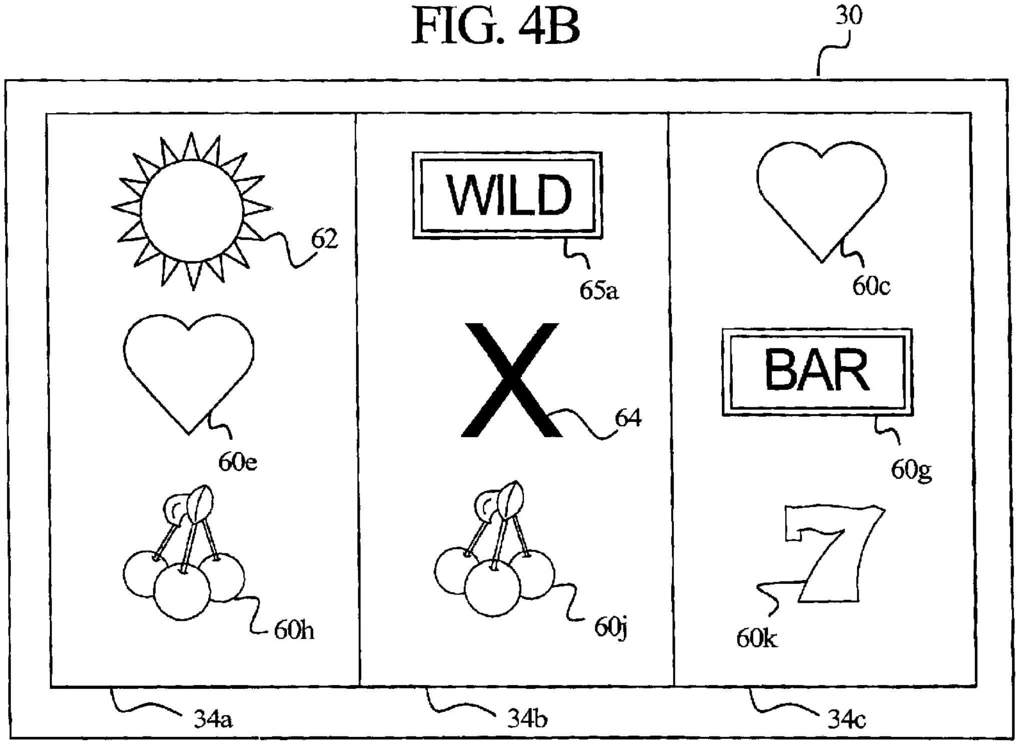
Figure 4C:
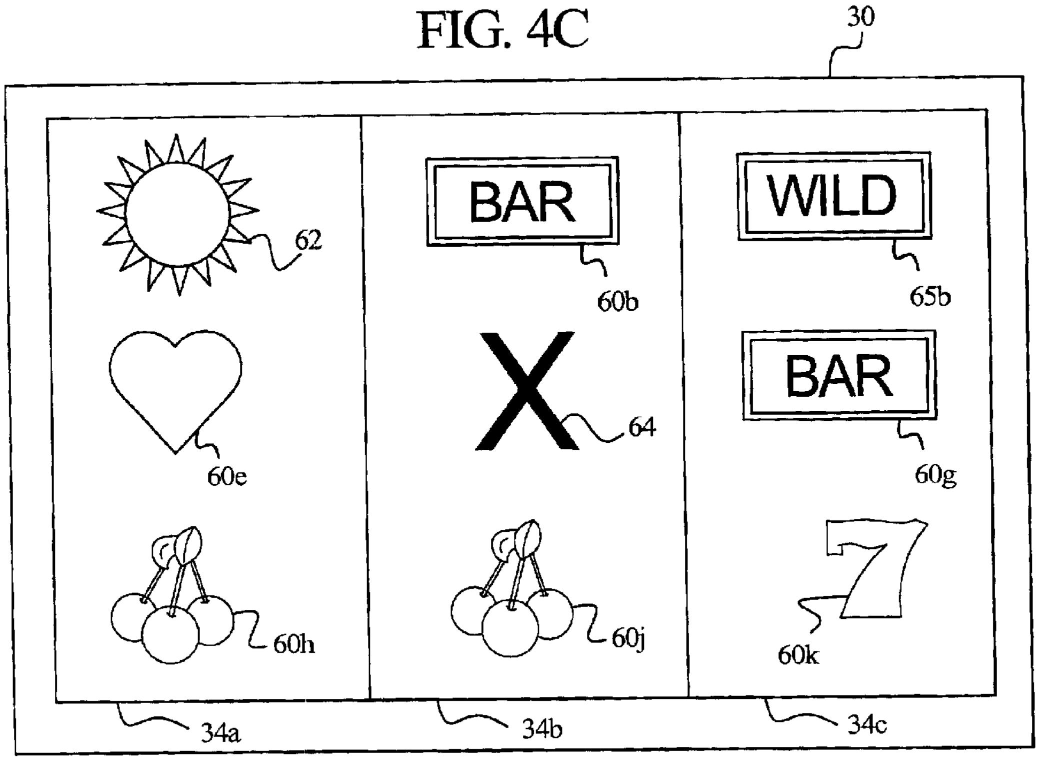
Figure 4D:
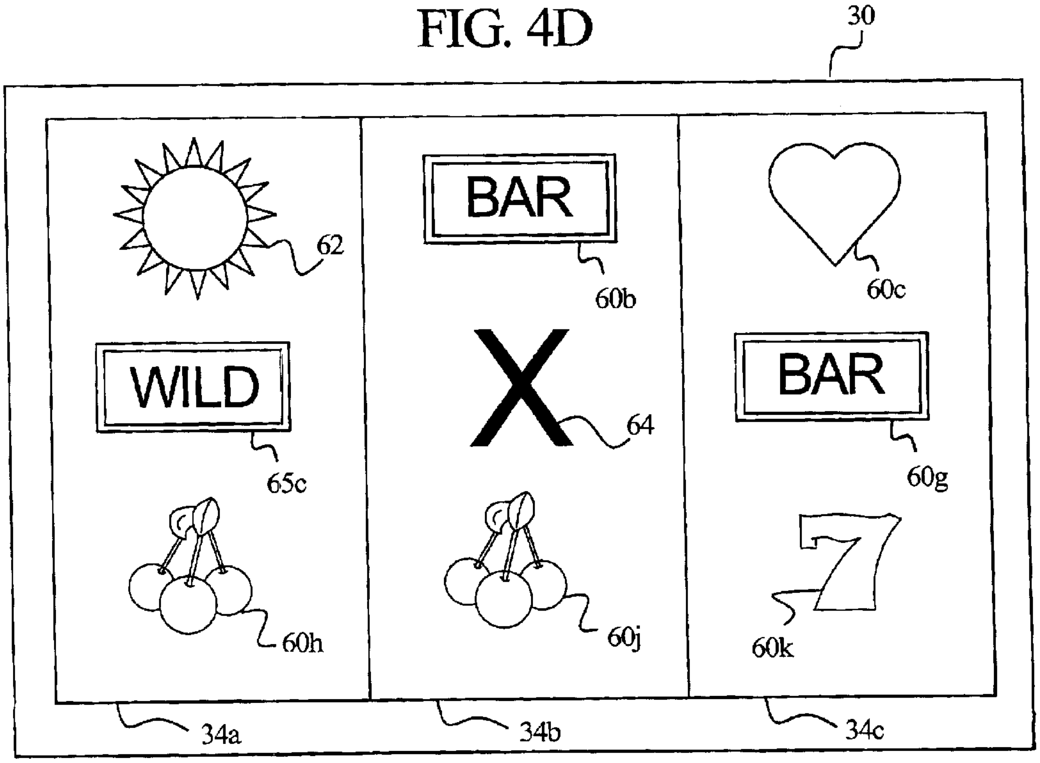

In another embodiment, the wild activation symbol and wild termination are fixed on the reels and immediately distinguished from the other symbols on the reels. In an example, the display device 30 displays three reels **34*a*, 34*b* and 34*c*, as illustrated in FIG. 4A. After the reels are spun, the top position on the first reel 34*a* displays a wild activation symbol 62 in the form of a sun symbol. The processor causes the symbols displayed within the display device to sequentially become wild. In this example, the other symbols become wild in a horizontal direction. As a result, the BAR symbol 60***b* on the second reel 34*b* becomes a wild symbol 65*a* as illustrated in FIG. 4B and the processor determines any awards. Next, that symbol changes back and the heart symbol 60*c* on the third reel 34*c* becomes a wild symbol 65*b* as illustrated in FIG. 4C and the processor determines any awards. The processor continues to transform symbols into wild symbols along the middle row of the display device. As a result, the heart symbol 60*e* on the first reel 34*a* subsequently becomes a wild symbol 65*c* as illustrated in FIG. 4D. The wild termination symbol 64 represented by the "X" in the middle position of the second reel. Accordingly, the processor stops further symbols from becoming wild in the horizontal direction beyond the position which the termination symbol occupies.

Figure 5A:
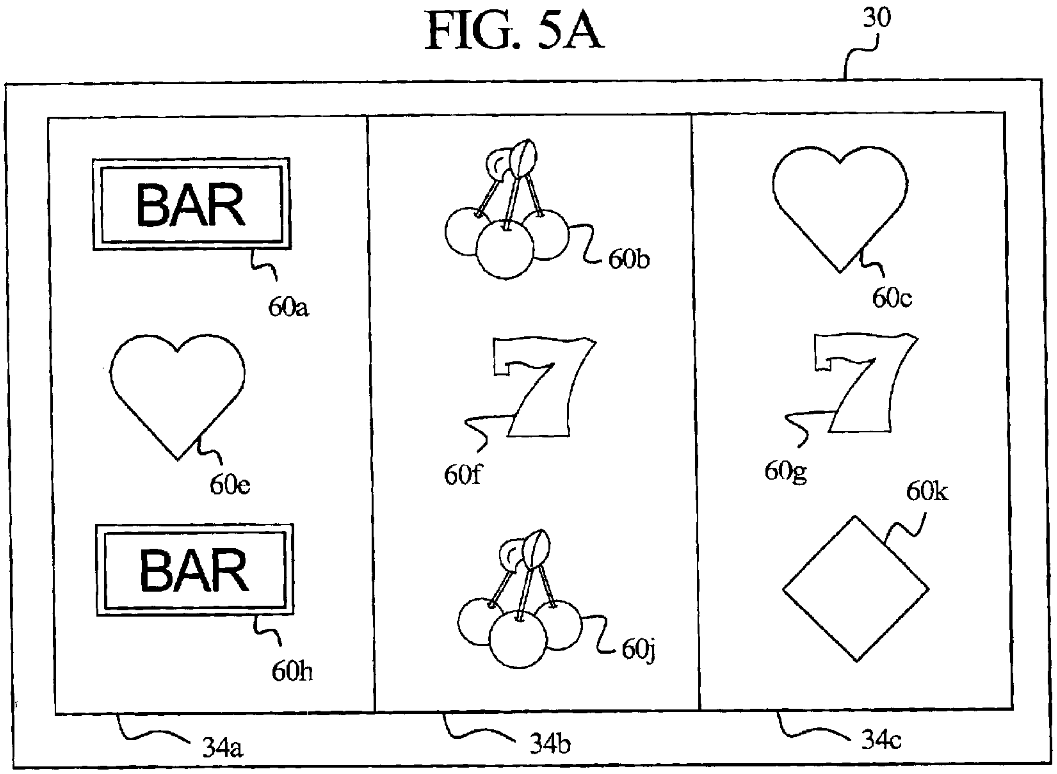
FIGS. 5A, 5B, 5C, 5D and 5E are front elevation views of a display device in which a wild activation symbol and wild termination symbol are displayed on a set of reels.
Figure 5B:
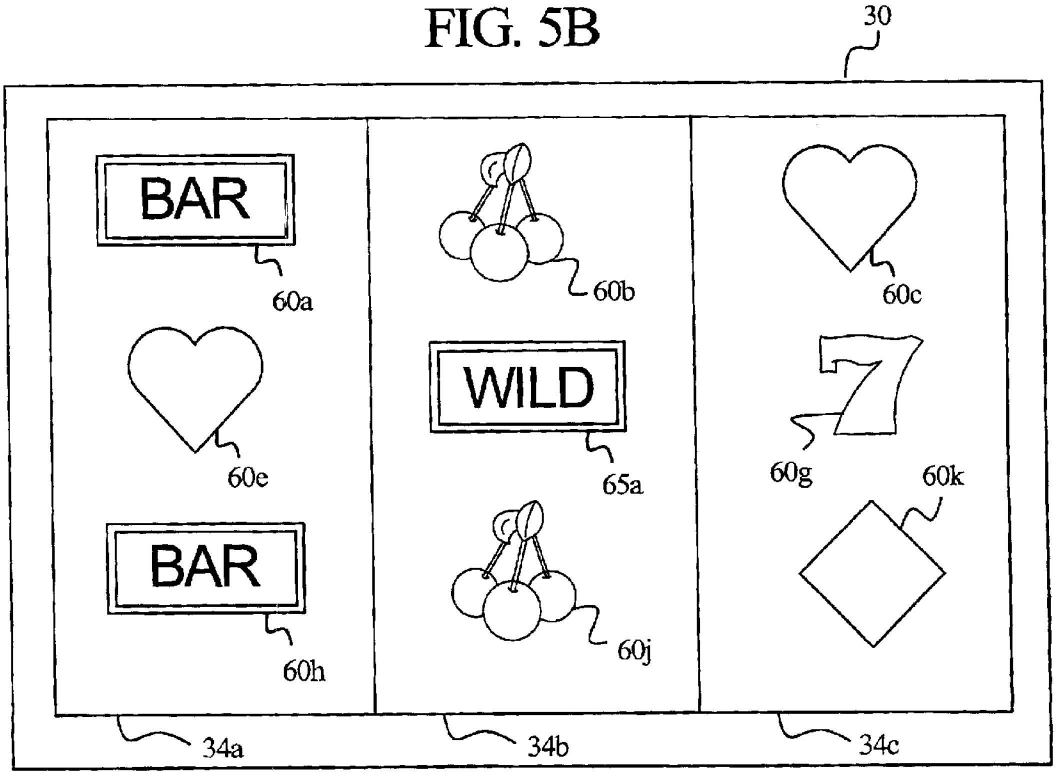
Figure 5C:
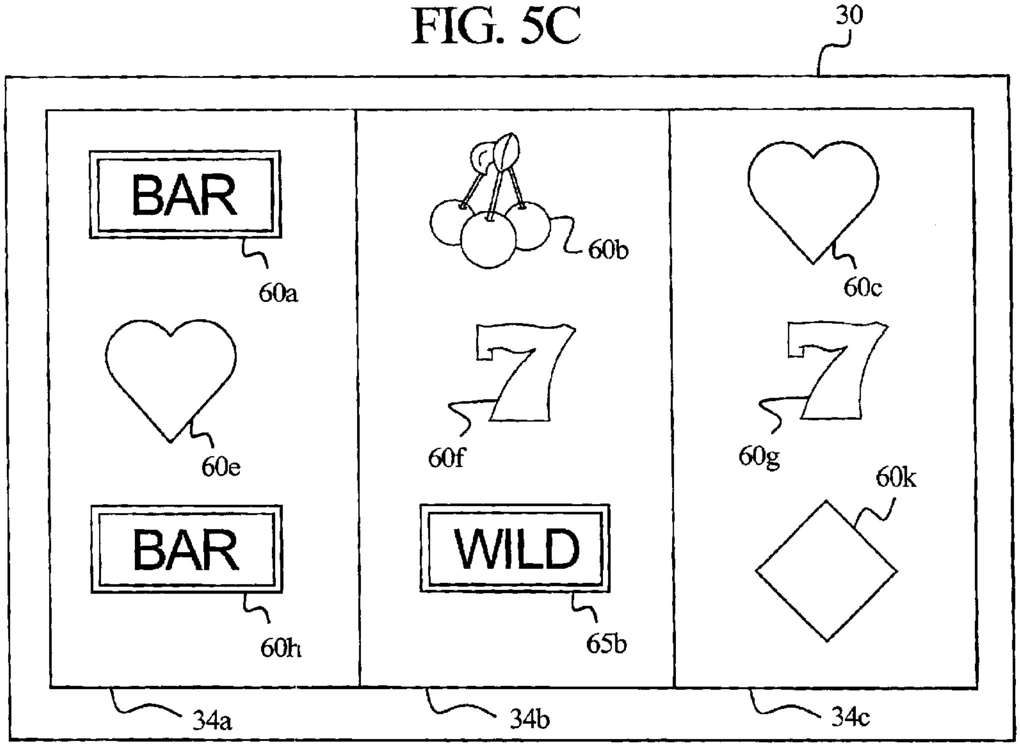
Figure 5D:
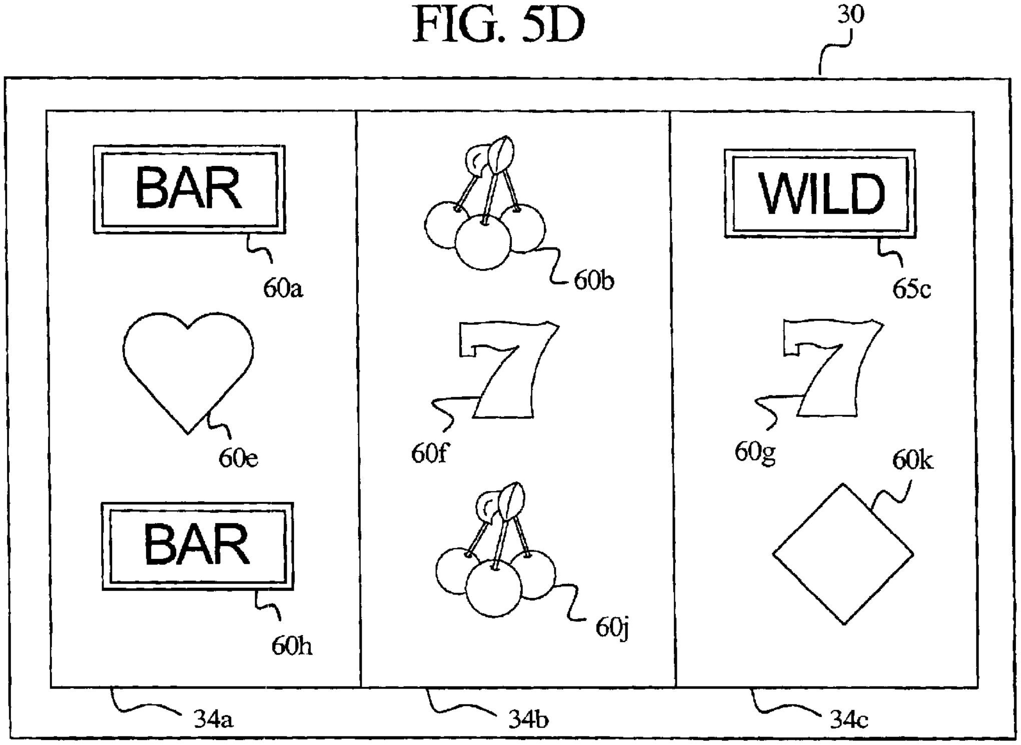
Figure 5E:
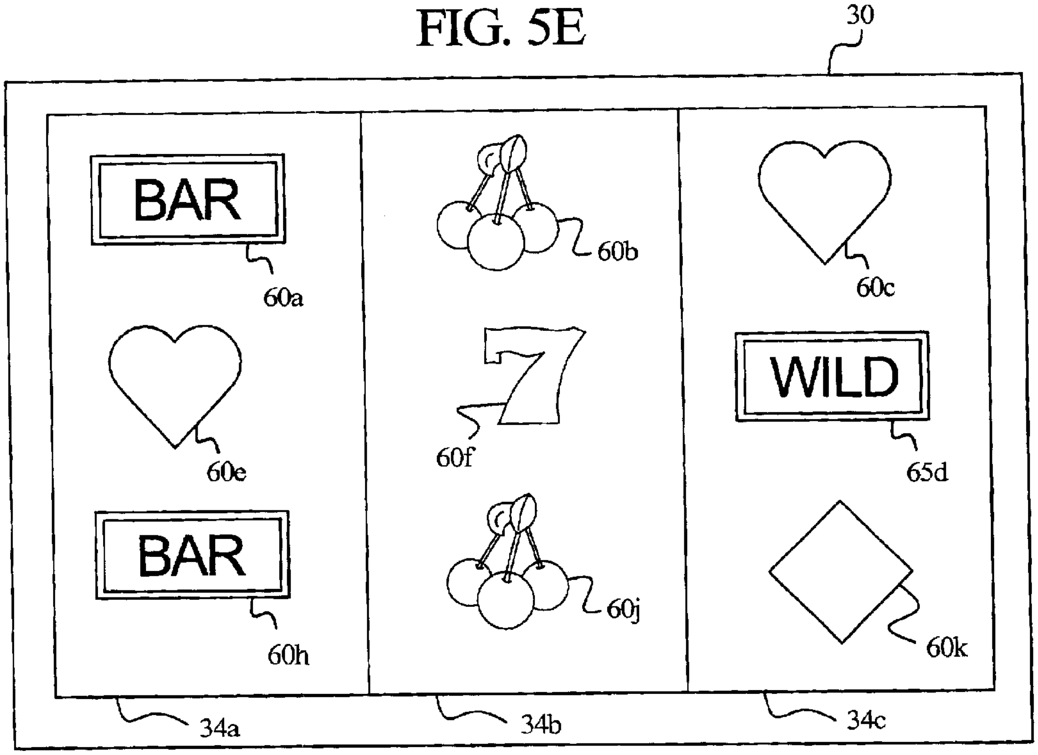

In another embodiment, the processor transforms symbols into wild symbols in a vertical direction within the display device. For example, a display device 30 displays three reels as shown in FIG. 5A. After the reels are spun, the second reel 34*b* displays a wild activation symbol in the form of a cherry symbol 60*b*. The third reel 34*c* displays a wild termination symbol in the form of a diamond symbol 60*k*. The processor transforms the "7" symbol 60*f* on the second reel into a wild symbol 65*a* as illustrated in FIG. 5B and the processor determines any award. Next, that symbol changes back and the cherry symbol 60*j* on the second reel is transformed into a wild symbol 65*b* as illustrated in FIG. 5C and the processor determines any award. The heart symbol 60*c* on the third reel then becomes a wild symbol 65*c* as illustrated in FIG. 5D and the processor determines any award. Next, the "7" symbol 60*g* on the third reel 34*c* becomes a wild symbol 65*d* as illustrated in FIG. 5E and the processor determines any award. The processor then stops further symbols from becoming wild in a vertical direction beyond the position the wild termination symbol occupies.

Figure 6A:
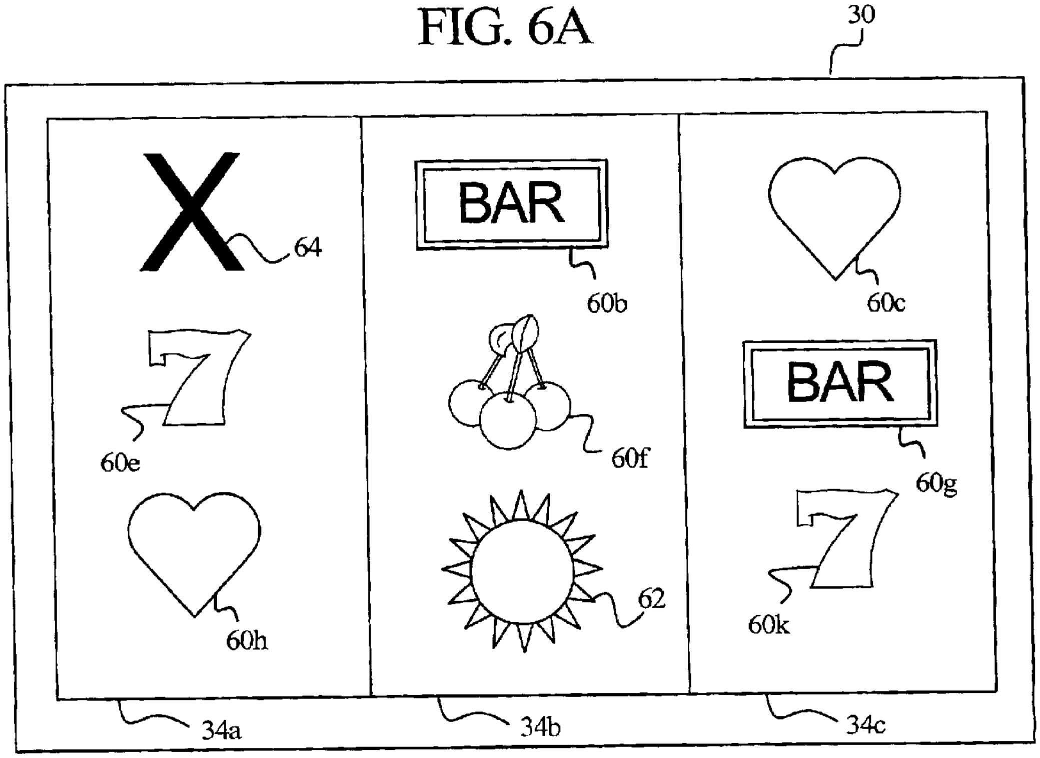
FIGS. 6A, 6B, 6C, 6D and 6E are front elevation views of a display device in which a wild activation symbol and a wild termination symbol are displayed on a set of reels.
Figure 6B:
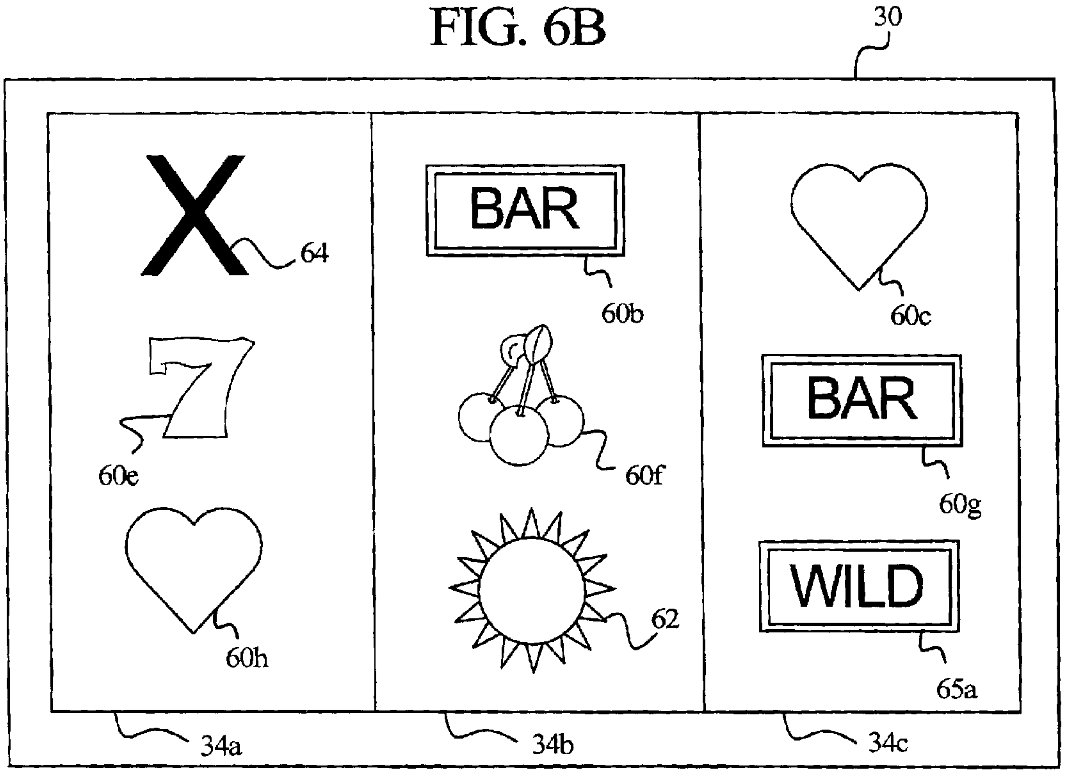
Figure 6C:
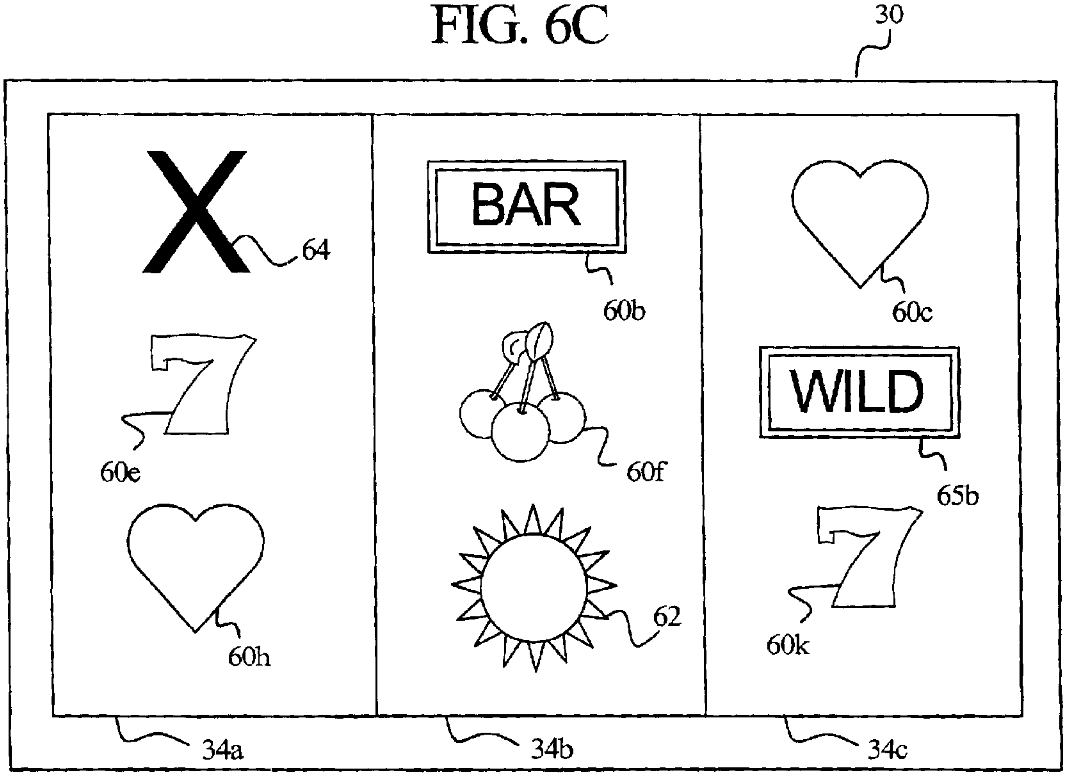
Figure 6D:
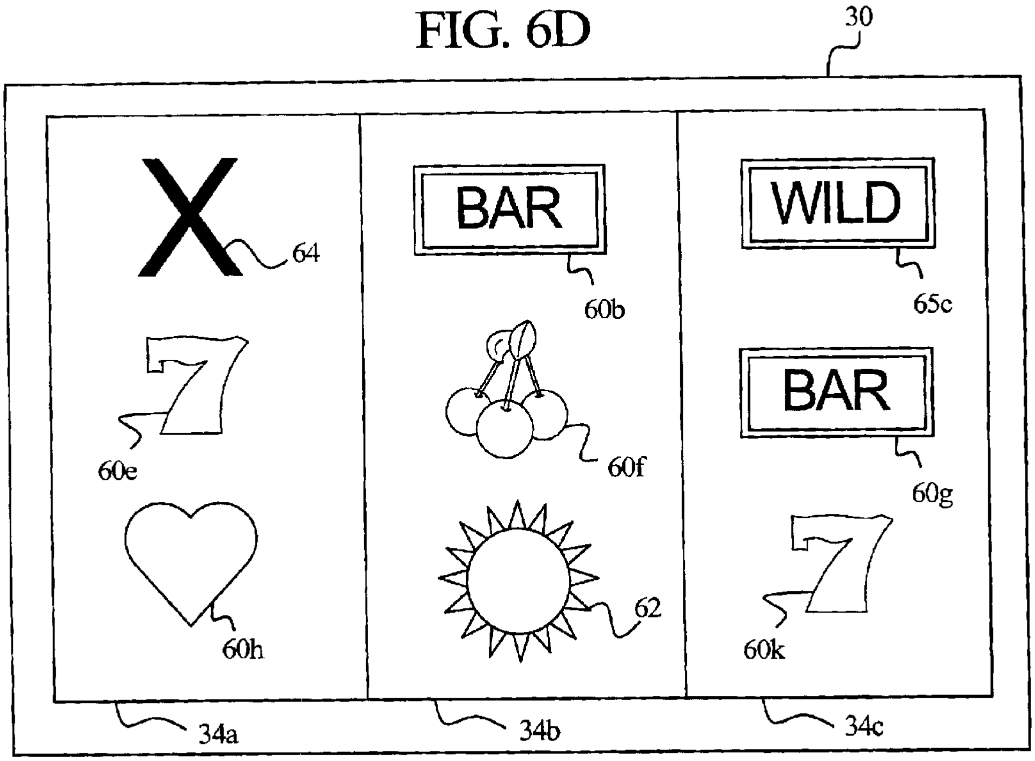
Figure 6E:
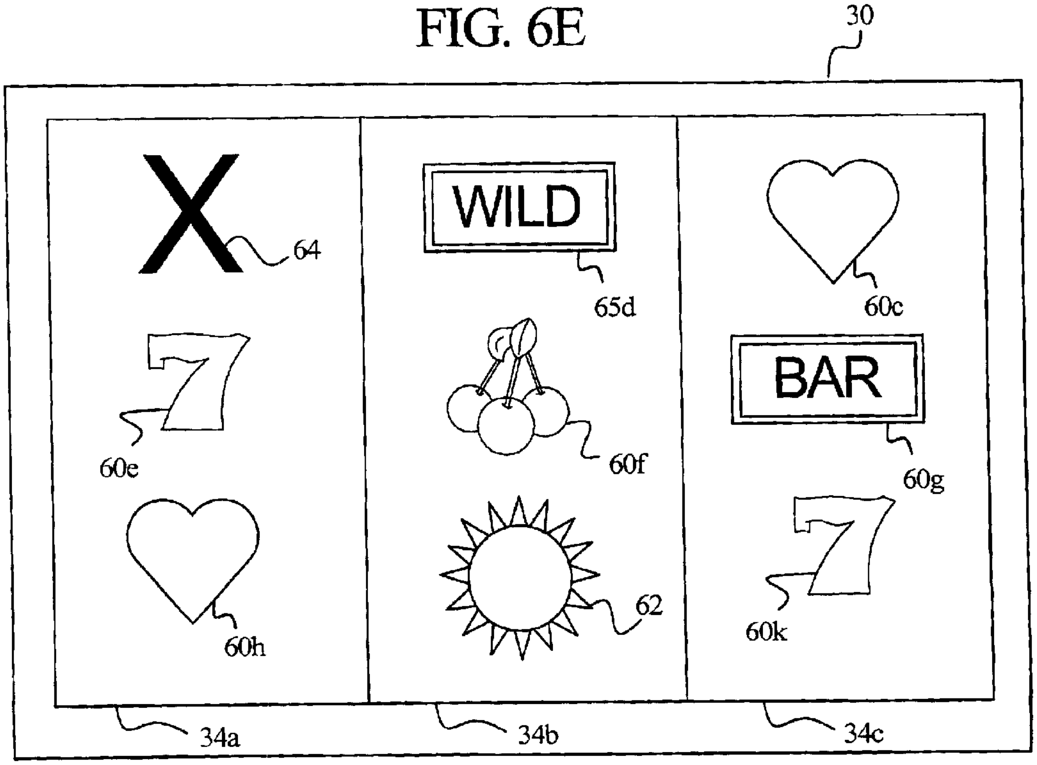

In one embodiment, the processor transforms symbols into wild symbols in a circular direction within the display device when the wild activation symbol and wild termination symbol are present within the display device. For example, the display device displays three reels 34*a*, 34*b* and 34*c*, and after the reels are spun or activated, a wild activation symbol 62 is displayed on the second reel as illustrated in FIG. 6A. A wild termination symbol 64 is displayed on the first reel 34*a*. The processor transforms the "7" symbol 60*k* displayed on the third reel into a wild symbol 65*a* as illustrated in FIG. 6B and the processor determines any award. Next, that symbol changes back and the BAR symbol 60*g* displayed on the third reel 34*c* then becomes a wild symbol 65*b* as illustrated in FIG. 6C. The heart symbol 60*c* on the third reel then becomes a wild symbol 65*c* as illustrated in FIG. 6D. The BAR symbol 60*b* on the second reel 34*b* then becomes a wild symbol 65*d* as illustrated in FIG. 6E. The processor stops further symbols from becoming wild in the circular direction beyond the position which the wild termination symbol 64 occupies.

It should be appreciated that the processor can cause symbols to become wild in any direction, (i.e., horizontally, vertically, diagonally) when a wild activation symbol is displayed within the display device. It should also be appreciated, that, when the processor transforms symbols in a particular direction and comes to an end of a reel or row, further transformations can occur on non-adjacent reels or rows. In an example, if the processor causes the top row of reels to become wild in a horizontal direction, the transformations can then continue along the bottom row of reels.

Figure 7A:
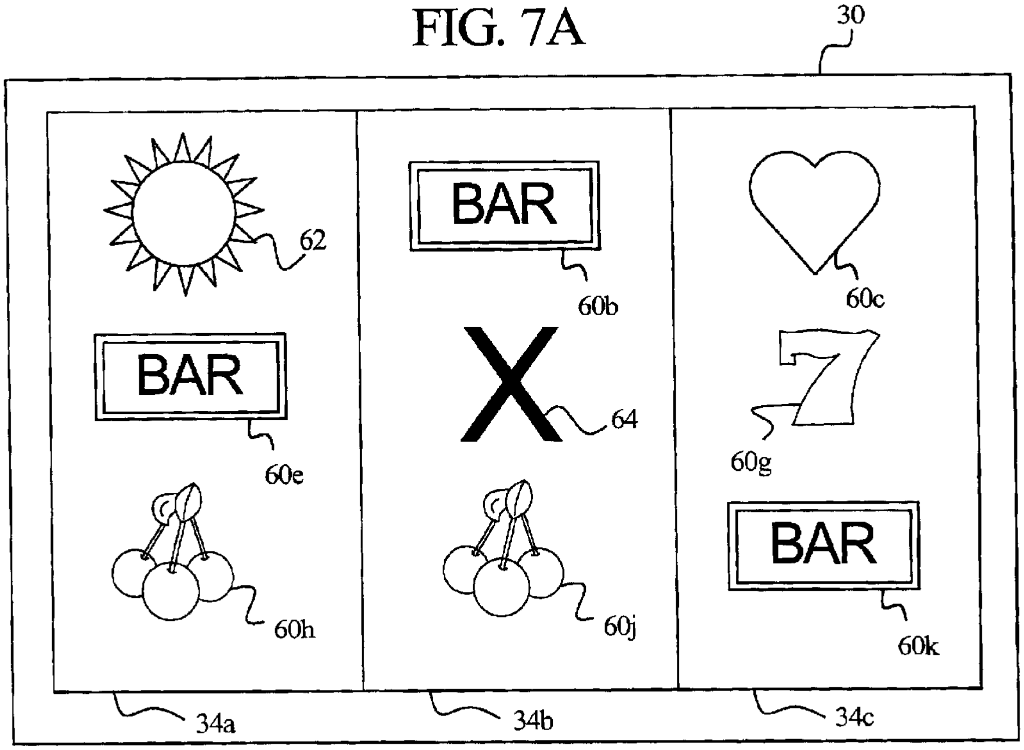
FIGS. 7A, 7B, 7C and 7D are front elevation views of a display device in which symbols displayed on a set of reels serve as a wild activation symbol and a wild termination symbol.
Figure 7B:
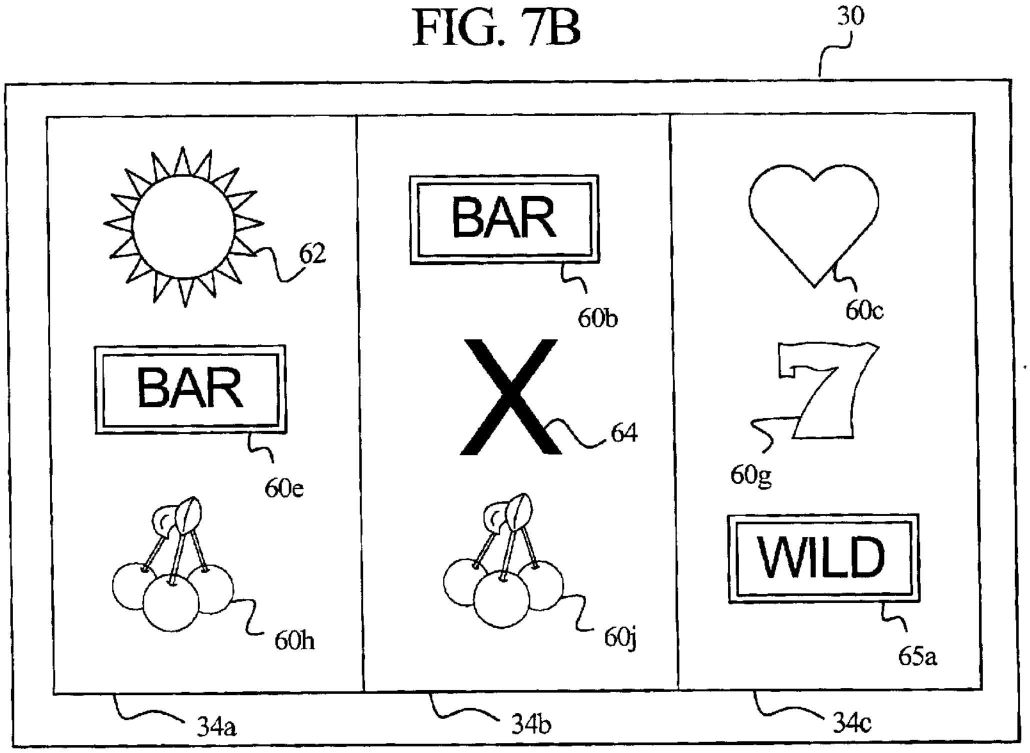
Figure 7C:
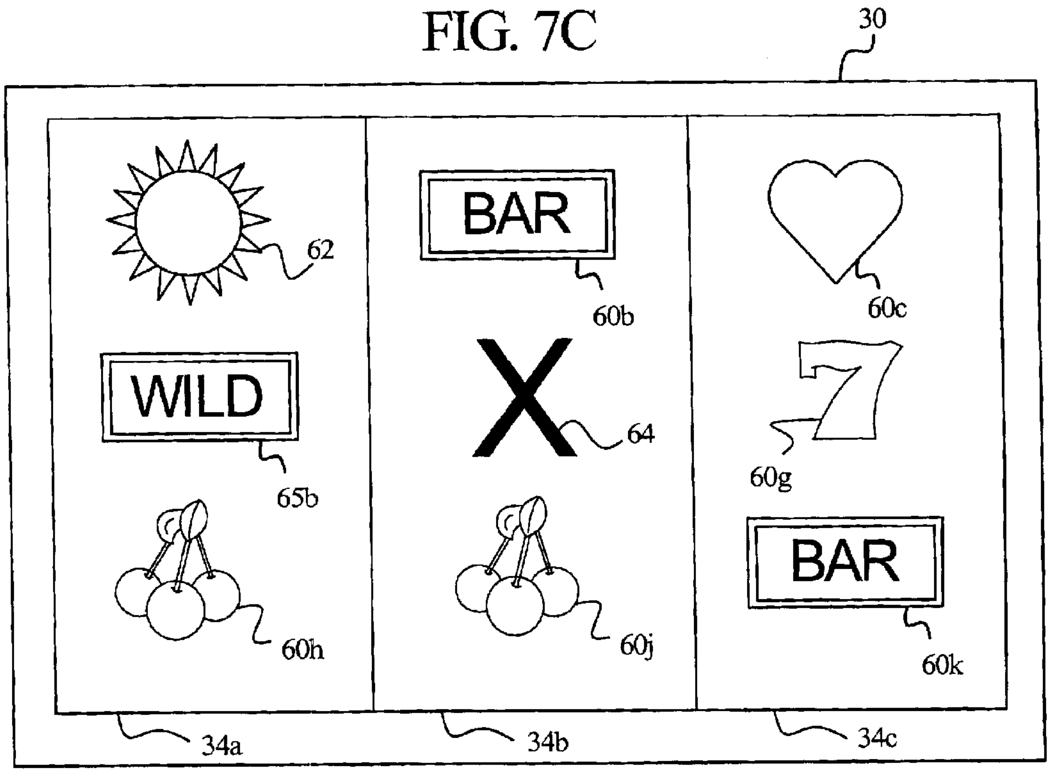
Figure 7D:
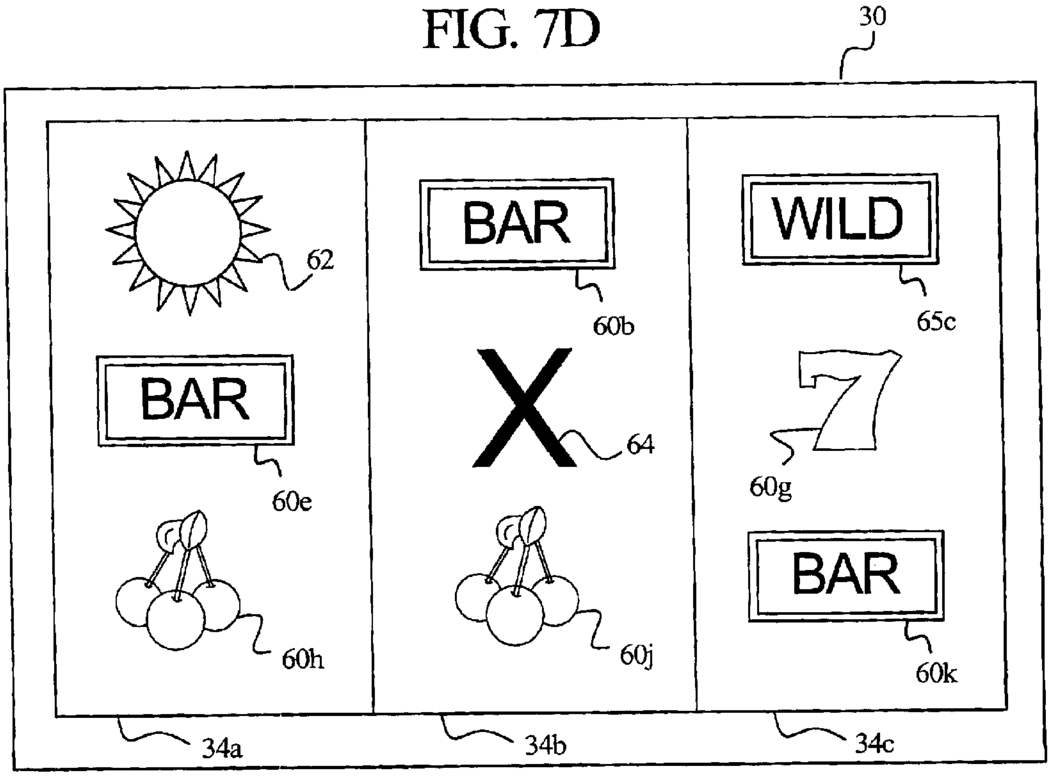

In one embodiment, the processor transforms other symbols into wild symbols in a random sequence (i.e., not along a predetermined path or direction) when the wild activation symbol and wild termination symbol are displayed within the display device 30. For example, after the reels are spun, a wild activation symbol 62 appears in a top position of the display device on the first reel 34*a*, as illustrated in FIG. 7A. The wild termination symbol 64 appears in a middle position of the display device on the second reel 34*b*. The processor randomly causes the BAR symbol 60*k* appearing on the third reel 34*c* to become a wild symbol 65*a* as illustrated in FIG. 7B and the processor determines any award. That symbol changes back and the processor randomly selects the BAR symbol 60*e* on the first reel 34*a* to become wild as illustrated in FIG. 7C. That symbol changes back and the processor randomly selects the heart symbol 60*c* on the third reel to become wild as illustrated in FIG. 7D. The processor prevents further transformations of symbols into wild symbols when the processor chooses to transform a symbol in the position occupied by the wild termination symbol.

Figure 7E:
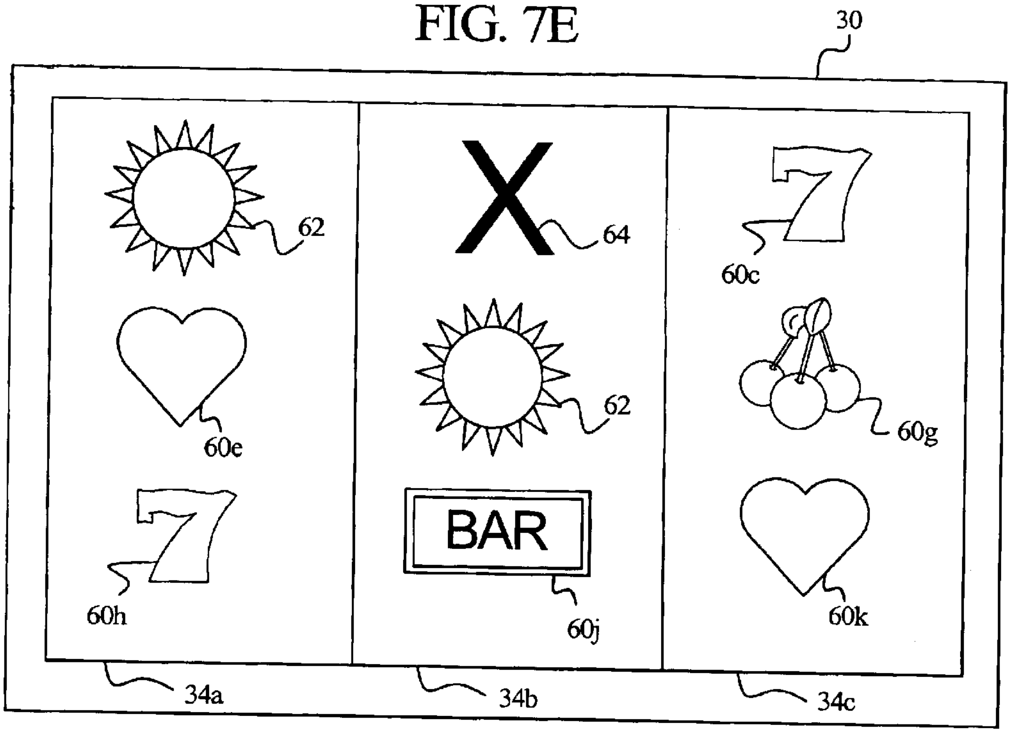
FIG. 7E is a front elevation view of a display device in which more than one symbol displayed on a set of reels serves as a wild activation symbol.
Figure 7F:
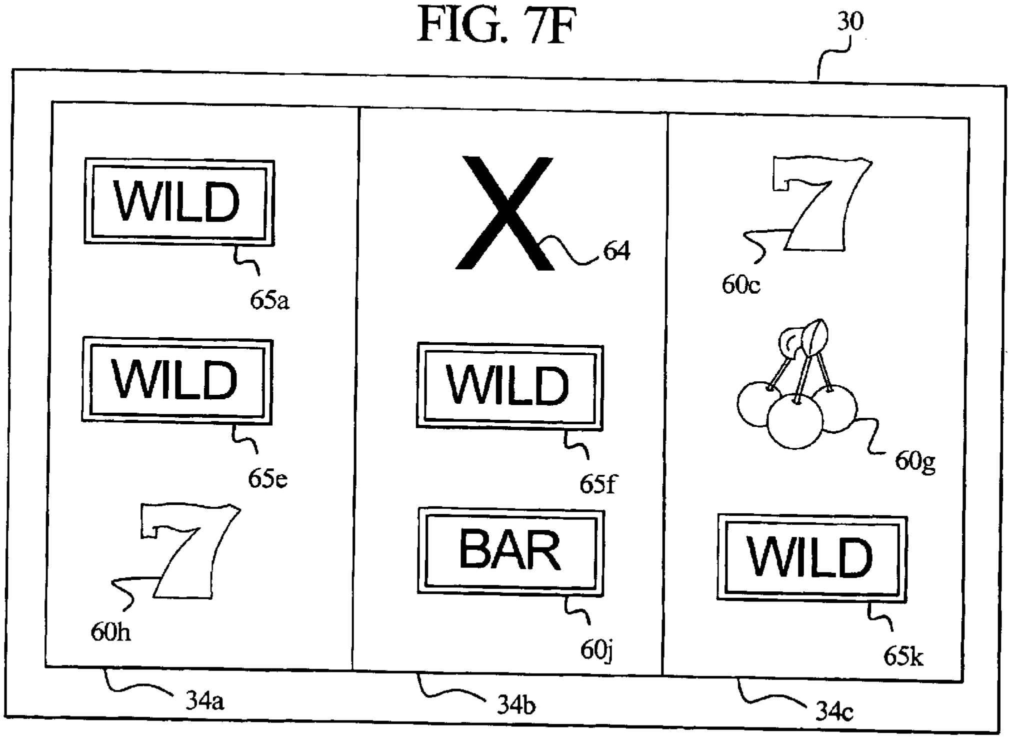
FIG. 7F is a front elevation view of a display device in which more than one symbol displayed on a set of reels serves as a wild termination symbol.

It should be appreciated that in alternative embodiments, the processor can cause one or more wild activation symbols on the reels within the display device. For example, in FIG. 7E, after the reels are spun, the processor determines that a sun symbol 62 which is not immediately distinguishable from the other symbols and is displayed within the display device on the first reel 34*a* is a wild activation symbol. The processor also determines that a heart symbol 60*a* is a wild activation symbol. The processor causes other sun symbols and heart symbols to become wild. The sun symbol 62 displayed on the second reel 34*b* becomes a wild symbol 65*f* as illustrated in 7F. The heart symbol 60*k* displayed on the first reel 34*a* becomes a wild symbol 65*k* as illustrated in 7F. It should be also appreciated that the processor can cause one or more related wild termination symbols on the reels within the display device. As a result, the display device may display one or more sets of symbols which are transformed into wild symbols. The sets can transform simultaneously or successively. Thus, for example, if two sets of a wild activation symbol and a related wild termination symbol appear, each set will be independently utilized. For example, in FIG. 7E, after the reels are spun, the processor determines that a BAR symbol 60*i* is a wild termination symbol. The processor also determines that a "7" symbol 60*h* is a wild termination symbol.

In a further embodiment, one or more wild activation symbols and one or more wild termination symbols are fixed on the reels. The processor may determine whether to display the wild activation symbol, the wild termination symbol, or both. If a wild termination symbol alone occurs, no symbols are changed into wild symbols. If a wild activation symbol and a wild termination symbol are displayed, the symbol transforms into wild symbols as described above. If a wild activation symbol occurs without a wild termination symbol, one, plurality, or all of the displayed symbols can transform into wild symbols.

In one embodiment of the present invention, the gaming device and specifically one or more of the reels (or cards as described below) will include natural or dedicated wild symbols which function in a conventional manner. If a transformation process occurs when one of these natural wild symbols are displayed on one or more of the reels, the transformation in one embodiment causes the natural wild symbol to become a modifier such as a multiplier which multiplies or otherwise modifies the award, if any, provided to the player. It should be appreciated that the natural wild symbol could alternatively transform into other modifiers such as one or more free games, more bonus games or bonus game triggers, or one or more repeats of the transformation process. It should also be appreciated that the processor could selectively or randomly determine to transform the natural wild symbol.

Figure 8A:
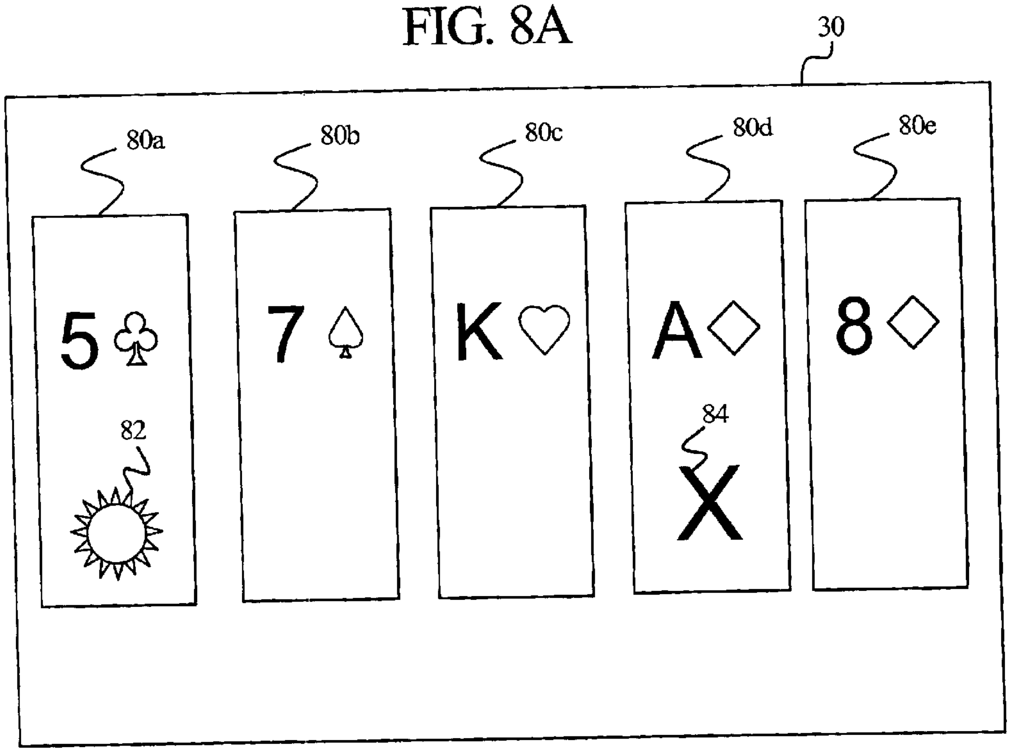
FIGS. 8A, 8B and 8C are front elevation views of a display device displaying a set of cards having a wild activation symbol and a wild termination symbol.
Figure 8B:
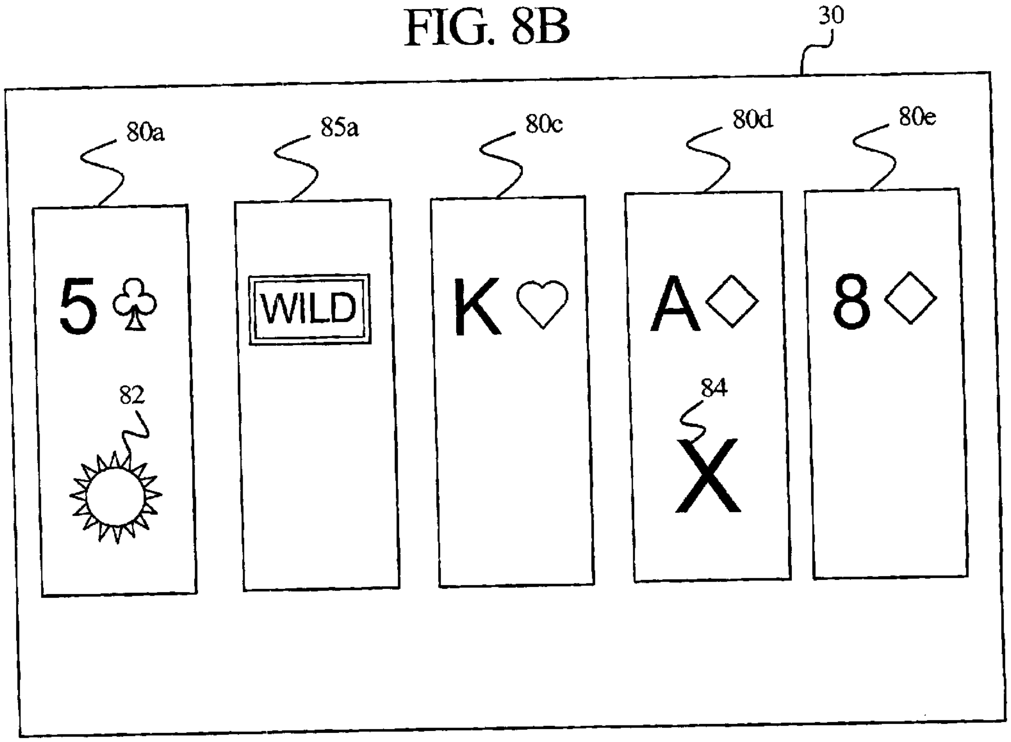
Figure 8C:
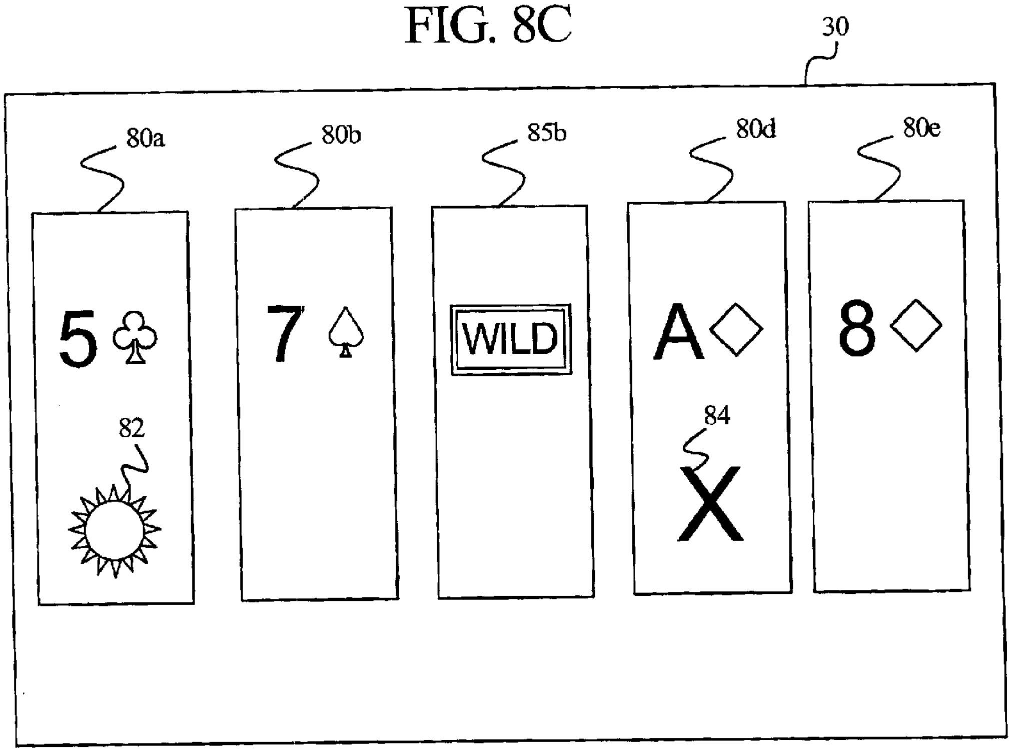

It should be appreciated that the present invention could be employed in other primary or bonus games. For instance, in one embodiment, the display device displays a set of cards in a video poker game. The processor randomly determines which, if any, cards will include a wild activation symbol and a wild termination symbol. For example, referring now to FIG. 8A, five cards 80*a* through 80*e* are displayed within the display device 30. A first card 80*a* displays a wild activation symbol 82. The wild activation symbol may be any symbol suitable for use by a gaming device. The processor causes the second card 80*b* to become a wild card 85*a* as illustrated in FIG. 8B and the processor determines if any award should be provided to the player. That card changes back and the third card 80*c* becomes a wild card 85*b* as illustrated in FIG. 8C.

Figure 9A:
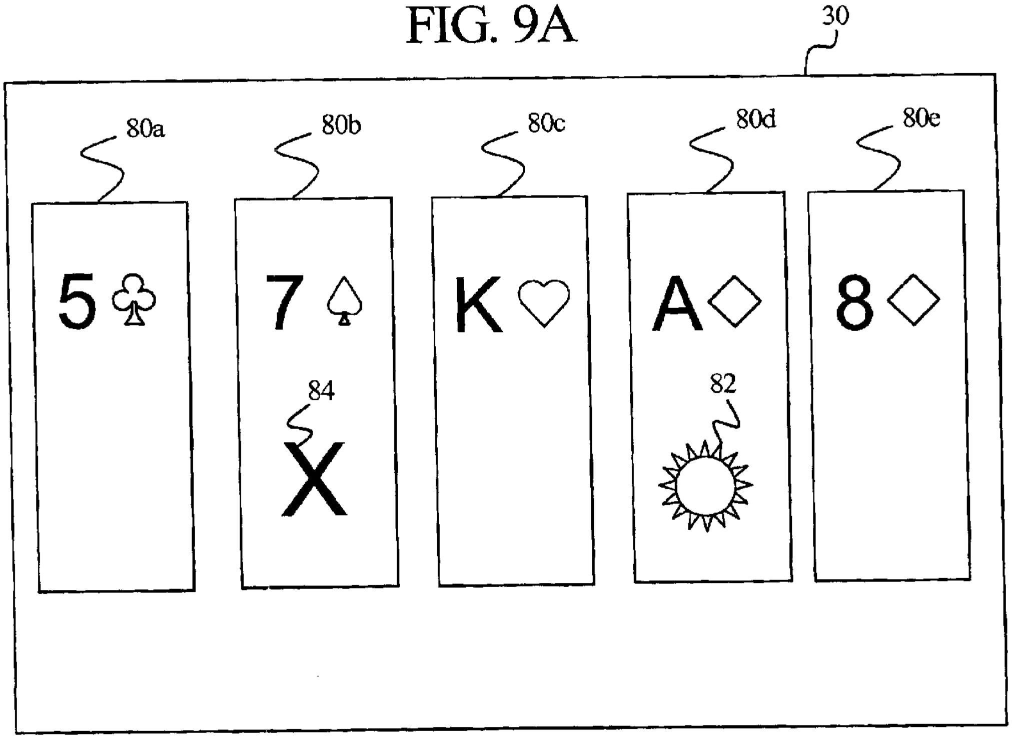
FIGS. 9A, 9B and 9C are front elevation views of a display device displaying a set of cards having a wild activation symbol and a wild termination symbol.
Figure 9B:
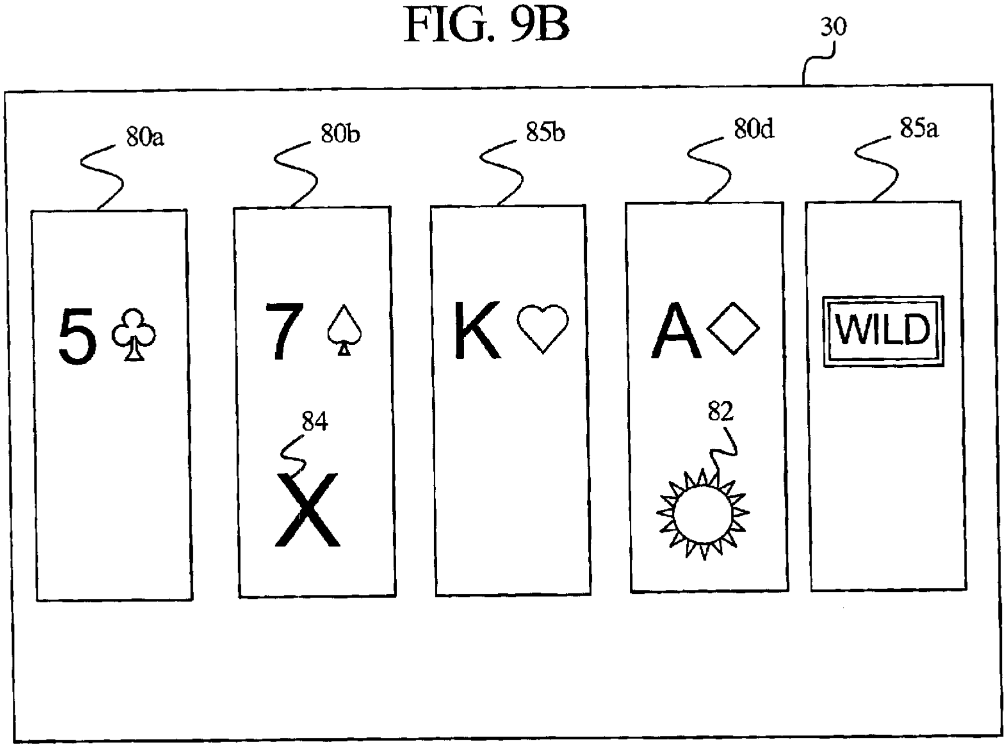
Figure 9C:
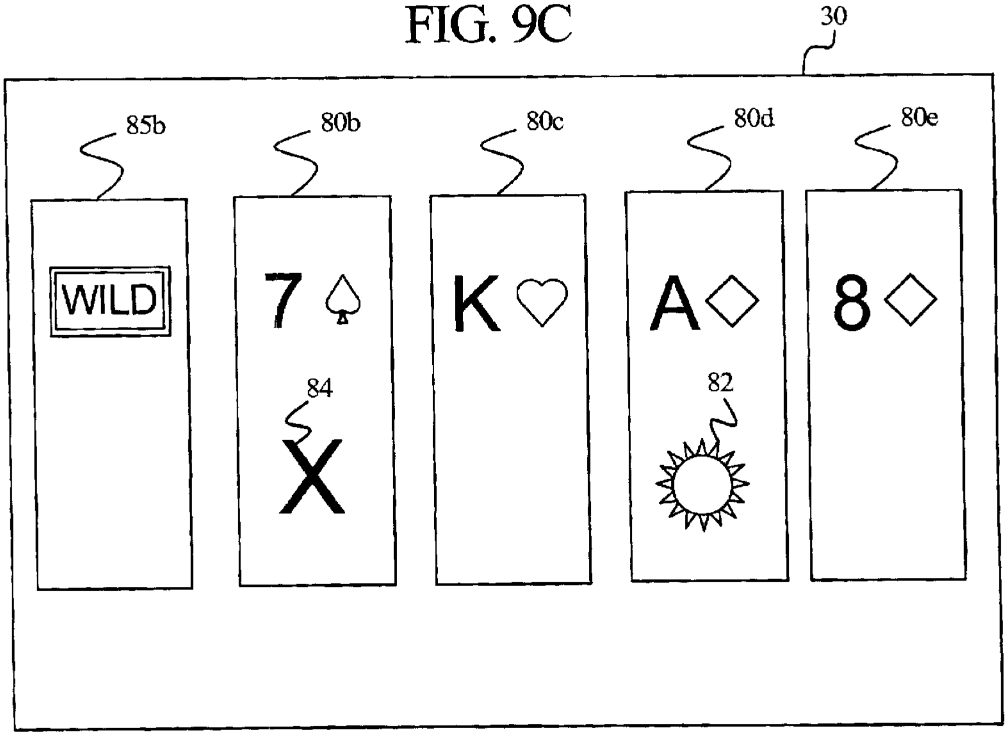

In another example, a fourth card 80*d* in a set of cards displays a wild activation symbol 82 as illustrated in FIG. 9A. The second card 80*b* displays a wild termination symbol 84. The processor causes the fifth card 80*e* to become wild as illustrated in FIG. 9B. Next, the first card 80*a* becomes wild as illustrated in FIG. 9C. The second card 80*b* displays a termination symbol 84. The processor stops any other cards from becoming wild when it reaches the card position displaying the wild termination symbol.

In another embodiment, the processor randomly determines a wild activation position within a set of cards displayed on the display device. The processor causes other cards to become wild in correlation to the wild activation position. A wild termination position is also determined within the set of cards displayed on the display device. The processor stops cards from becoming wild beyond the wild termination position.

Figure 10A:
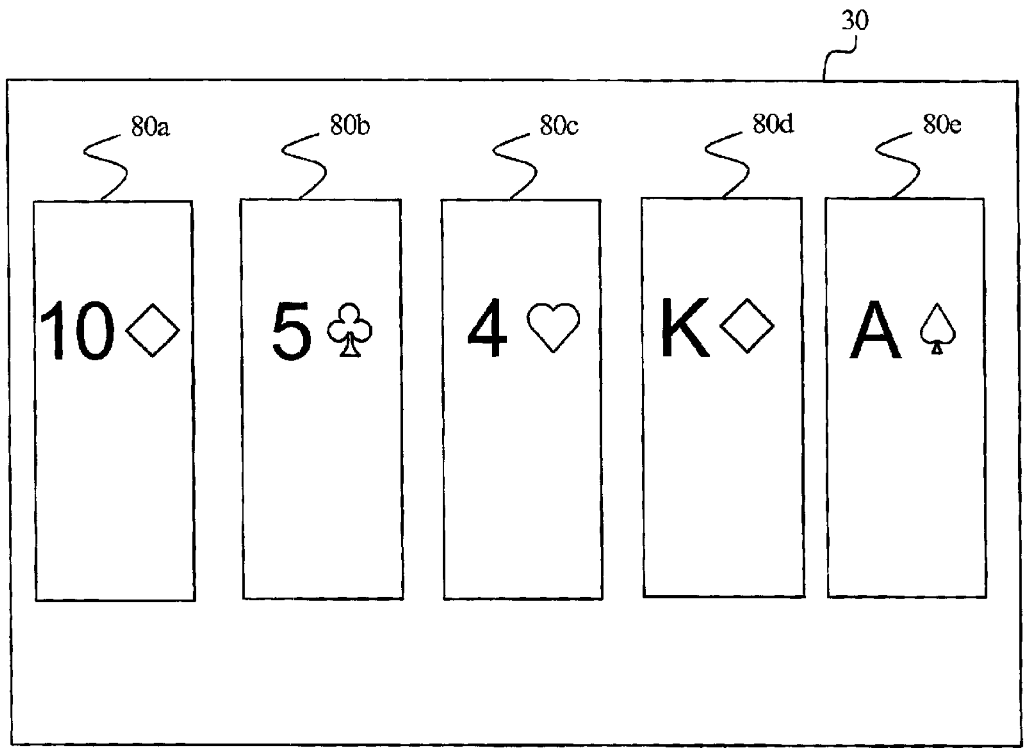
FIGS. 10A, 10B and 10C are front plan views of a display device displaying a set of cards in which a certain card occupies a wild activation position and a certain card occupies a termination position.
Figure 10B:
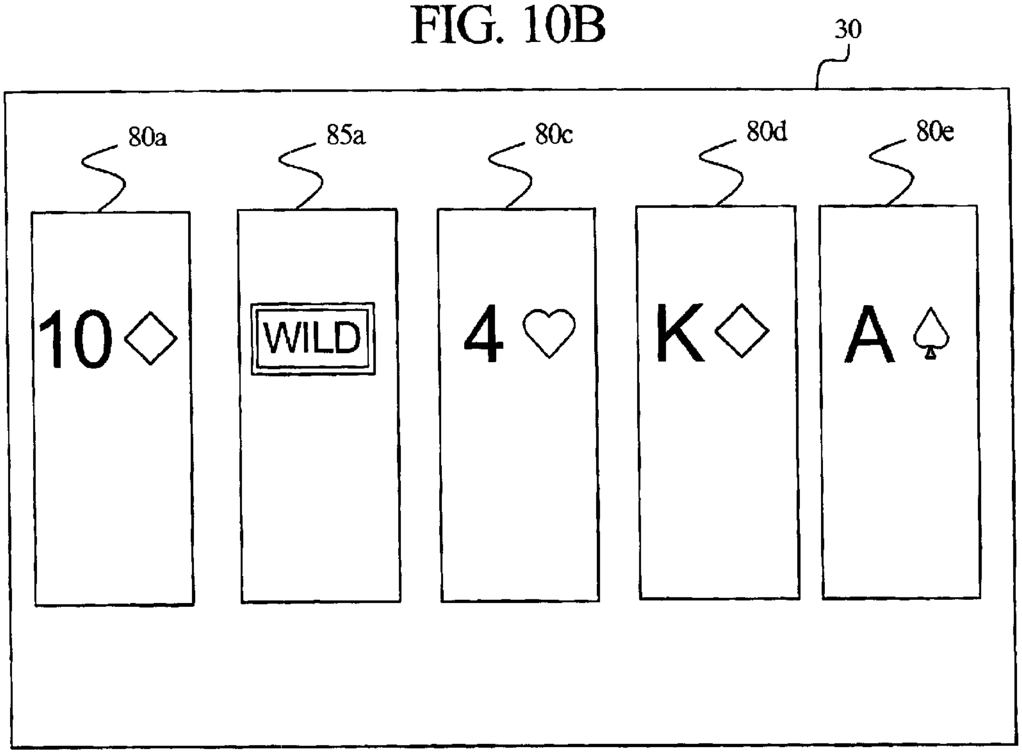
Figure 10C:
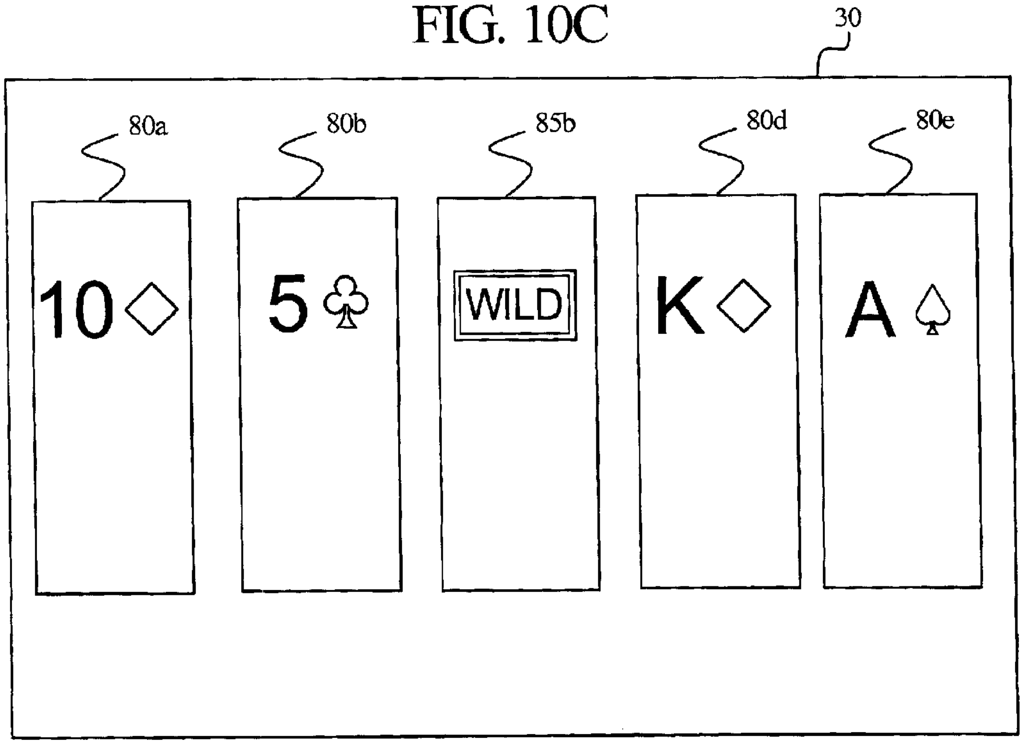

In an example, the display device 30 displays five cards 80*a* through 80*e,* as illustrated in FIG. 10A. Prior to dealing the cards, the processor determines the first card position 80*a* to be the wild activation position. The processor also determines the fourth card position 80*d* to be a wild termination position. The processor then successively transforms the second and third cards into wild cards 85*a* and 85*b,* as illustrated in FIGS. 10B and 10C. The processor prevents any other cards from transforming into wild cards beyond the fourth card position. It should be appreciated that the processor can alternatively transform the cards into wild cards in a random sequence.

In another embodiment, the processor can determine the wild activation position based on a type of card displayed. For example, the processor can determine that the wild activation position will be any position in which a King, if any, is displayed. The processor then determines a wild termination position based on a second type of card. For example, the processor determines that a card displaying a diamond, if any, will correlate to a wild termination position. It is appreciated that the individual determinations of a wild activation position and wild termination position can be dependent or completely independent of each other. For example, the wild activation position may be determined by the suit of the card while the wild termination position may be determined by the numerical value of the card.

It should also be appreciated that the processor could randomly provide a wild termination symbol without a wild activation symbol and vice versa. It should also be appreciated that the player could be allowed or required to hold a wild activation symbol or wild termination symbol.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device comprising:

a plurality of reels;

a plurality of symbols on said reels, wherein at least one of said symbols is adapted to function as a wild activation symbol and at least one of said symbols is adapted to function as a wild termination symbol, said symbol adapted to function as a wild termination symbol adapted to occur at any one of a plurality of different display positions on said reels;

a display device for displaying said reels and at least one of the symbols on each reel; and a processor in communication with said display device, wherein said processor is adapted to selectively determine if one of said plurality of symbols displayed on the reels by the display device after a spin of the reels is adapted to function as the wild activation symbol and if one of said symbols displayed on said reels is adapted to function as the wild termination symbol, the Processor transforms said symbols of the plurality of symbols into wild symbols starting at the symbol adapted to function as the wild activation symbol and ending at the symbol adapted to function as the wild termination symbol.

2. The gaming device of claim 1, wherein the processor randomly determines which displayed symbol is the wild activation symbol.

3. The gaming device of claim 1, wherein the processor randomly determines which displayed symbol is adapted to function as the wild termination symbol.

4. The gaming device of claim 1, wherein the processor transforms symbols of the plurality of displayed symbols into wild symbols in a random sequence starting with the symbol adapted to function as the wild activation symbol and ending with the symbol adapted to function as the wild termination symbol.

5. The gaming device of claim 1, wherein the processor transforms symbols in the plurality of displayed symbols into wild symbols in a pattern on the display device starting with the symbol adapted to function as the wild activation symbol and ending with the symbol adapted to function as the wild termination symbol.

6. The gaming device of claim 1, wherein the processor causes the display device to display a change of the symbol adapted to function as the wild activation symbol into the wild activation symbol and to display a change of the symbol adapted to function as the wild termination symbol into the wild termination symbol.

7. The gaming device of claim 1, wherein the processor is adapted to repeat the determinations.

8. The gaming device of claim 1, wherein the processor determines if more than one of the symbols displayed on the reels is adapted to function as the wild termination symbol.

9. A gaming device comprising:

a plurality of reels;

a plurality of symbols on the reels, wherein at least one of said symbols is adapted to function as a wild activation symbol and at least one of said symbols is adapted to function as a wild termination symbol, said symbol adapted to function as a wild termination symbol adapted to occur at any one of a plurality of different display positions on said reels;

a display device for displaying said reels and at least one of the symbols on each reel; and a processor in communication with the display device, wherein the processor randomly determines if one of said symbols displayed by the display device is a adapted to function as the wild activation symbol and if one of the symbols displayed on the reels is adapted to function as the wild termination symbol, and based on said determination transforms the symbol adapted to function as the activation symbol into a wild symbol, transform the symbol adapted to function as the wild termination symbol into the wild termination symbol, and transforms said displayed symbols into wild symbols starting with said wild activation symbol and ending with said wild termination symbol.

10. The gaming device of claim 9, wherein the displayed symbols are transformed into wild symbols in a pattern from the wild activation symbol to the wild termination symbol display position if the processor determines that one of said symbols is a wild activation symbol.

11. The gaming device of claim 9, wherein the displayed symbols are randomly transformed into wild symbols if the processor determines that one of said symbols is a wild activation symbol.

12. A gaming device comprising:

a plurality of reels;

a plurality of symbols on said reels, wherein at least one of said symbols is adapted to function as a wild activation symbol and at least one of said symbols is adapted to function as a wild termination symbol, said symbol adapted to function as a wild termination symbol adapted to occur at any one of a plurality of different display positions on said reels;

a display device for displaying said reels and at least one of the symbols on each reel; and a processor in communication with the display device, wherein the processor is adapted to determine if one of said plurality of symbols displayed by the display device is adapted to function as the wild activation symbol and if one of the symbols displayed on the reels is adapted to function as the wild termination symbol, and to cause the display device to change said symbols into a wild activation symbol and a wild termination symbol based on such determinations, and wherein the processor transforms said symbols of the plurality of symbols into wild symbols starting with said wild activation symbol and ending with said wild termination symbol.

13. A gaming device comprising:

a plurality of reels;

a plurality of symbols on said reels, wherein at least one of the symbols is a wild activation symbol and at least one of said symbols is a wild termination symbol, said wild termination symbol adapted to occur at any one of a plurality of different display positions on said reels;

a display device for displaying said reels; and a processor in communication with the display device, wherein the processor and the display device are adapted to:

activate the reels;

cause the reels to stop and to display at least one symbol on each reel;

determine if one of said displayed symbols is the wild activation symbol;

transform at least one symbol into a wild symbol if one of said displayed symbols is determined to be the wild activation symbol;

determine if one of the displayed symbols is the termination symbol; and transform said symbols of the plurality of displayed symbols into wild symbols starting with the wild activation symbol and ending with the wild termination symbol.

14. A gaming device comprising:

a plurality of reels;

a plurality of symbols on said reels including at least one natural wild symbol;

a display device for displaying said reels and at least one symbol on each reel; and a processor in communication with the display device, wherein upon an occurrence of a triggering event, if the natural wild symbol is displayed on the reels, and the processor transforms said natural wild symbol, the natural wild symbol changes into a modifier which modifies an award provided to a player associated with said displayed symbols.

15. The gaming device of claim 14, wherein the modifier is a multiplier.

16. A method for operating a gaming device having wild symbols, said method comprising the steps of:

(a) activating a plurality of reels including a plurality of symbols;

(b) displaying a plurality of said symbols on the reels;

(c) determining if at least one symbol displayed on the reels is a wild activation symbol;

(d) determining if at least one symbol displayed on the reels is a wild termination symbols, said wild termination symbol adapted to occur at any one of a plurality of different display positions on said reels;

(e) if one of said symbols is the wild activation symbol and one of said symbols is the wild termination symbol, transforming said displayed symbols into wild symbols from the wild activation symbol to the wild termination symbol; and (f) awarding a player for any winning combinations.

17. The method of claim 16, which includes the step of transforming said displayed symbols in a pattern.

18. The method of claim 16, which includes the step of transforming said displayed symbols in a random sequence.

19. The method of claim 16, which includes the step of transforming displayed symbols into wild symbols successively.

20. The method of claim 16, which includes the step of simultaneously transforming at least two displayed symbols into wild symbols.

21. A method for operating a gaming device, said method comprising the steps of:

(a) displaying a plurality of reels including a plurality of symbols;

(b) displaying a wild activation symbol on one of said reels;

(c) displaying a wild termination symbol on one of the said reels, said wild termination symbol adapted to occur at any one of a plurality of different display positions on said reels;

(d) transforming each symbol in the plurality of display symbols into a wild symbol from the wild activation symbol to the wild termination symbol; and (e) stopping transformations of said symbols into wild symbols at the position of the wild termination symbol.

22. The method of claim 21, which includes the step of transforming said symbol into wild symbols in a pattern based on a position of the wild activation symbol.

23. The method of claim 22, which includes the step of stopping further transformation of symbols into wild symbols in the pattern based on a position of the wild termination symbols.

24. The method of claim 21 which includes the step of transforming said symbols into wild symbols successively.

25. The method of claim 21, which includes the step of transforming said symbols into wild symbols simultaneously.

26. The method of claim 21, which includes the step of transforming said symbols into wild symbols in a random sequence.

27. A gaming device comprising:

a display device;

a plurality of cards adapted to be displayed by the display device;

at least one wild activation symbol;

at least one wild termination symbols, said wild termination symbol adapted to occur at any one of the cards displayed by the display device; and a processor in communication with said display device for determining whether at least one card displayed by the display device is one of the wild activation symbols and further determining whether at least one card displayed by the display device is one of the wild termination symbols and for transforming at least one card displayed by the display device into a wild card if one of the cards displayed within the display device is a wild activation symbol and if the wild termination symbol is also displayed transforming said cards from the wild activation symbol to the wild termination symbol.

28. The gaming device of claim 27, wherein the processor is adapted to transform at least one of said cards into a wild card in a pattern beginning from the wild activation symbol displayed by the display device.

29. The gaming device of claim 28, wherein the processor is adapted to stop transformation of said cards into wild cards in the pattern when the processor reaches the position, if any, of the wild termination symbol displayed by the display device.

30. The gaming device of claim 29, wherein the processor is adapted to transform said cards into wild cards in a random sequence when the wild activation symbol is displayed within the display device.

31. A gaming device comprising:

a display device; and a processor adapted to communicate with said display device, said display device and said processor adapted to:

(a) display a plurality of cards;

(b) determine a wild activation position within the display device for one of the plurality of cards;

(c) determine a wild termination position from a plurality of different display positions for one of the plurality of cards; and (d) transform each of the plurality of cards into wild cards starting at the wild activation position and ending at the wild termination position.

32. The gaming device of claim 31, wherein said display device and said processor are adapted to transform the cards into wild cards in a pattern.

33. The gaming device of claim 31, wherein said display device and said processor are adapted to transform the cards into wild cards in a random sequence.

34. The gaming device of claim 31, wherein said display device and said processor are adapted to transform the cards into wild cards successively.

35. The gaming device of claim 31, wherein the processor determines the wild activation position by a specific type of card within the plurality of cards displayed within the display device.

36. The gaming device of claim 31, wherein the processor determines the wild termination position by a specific type of card within the plurality of cards displayed within the display device.

37. The gaming device of claim 31, wherein the processor determines the wild activation position by a position at which a card within the plurality of cards is displayed within the display device.

38. The gaming device of claim 37, wherein the processor determines the wild termination position by a position at which a card within the plurality of cards is displayed within the display device.

39. A gaming machine comprising display means; and game control means arranged to control images displayed on the display means; the game control means being arranged to play a game wherein a plurality of symbols are randomly selected and displayed on the display means and, if a predetermined triggering event occurs, a wild activation symbol is provided on the display means in a location of one of the plurality of randomly selected symbols, a wild termination symbol is provided on the display means in a location of one of the plurality of randomly selected symbols, said wild termination symbol being adapted to occur at one of a plurality of different display positions on said display means, said game control means causing the symbols to become sequentially wild from a location on the display related to the wild activation symbol to a location on the display related to the wild termination symbol, an award being provided for winning combinations formed from each wild symbol.

* * * * *

UNITED STATES PATENT AND TRADEMARK OFFICE

CERTIFICATE OF CORRECTION

PATENT NO. : 6,805,349 B2 Page 1 of 1
DATED : October 19, 2004
INVENTOR(S) : Anthony J. Baerlocher et al.

It is certified that error appears in the above-identified patent and that said Letters Patent is hereby corrected as shown below:

Column 1,
Line 10, delete "a"

Signed and Sealed this

Twenty-fifth Day of January, 2005

JON W. DUDAS
*Director of the United States Patent and Trademark Office*